(12) United States Patent
McCoy et al.

(10) Patent No.: US 7,765,332 B2
(45) Date of Patent: Jul. 27, 2010

(54) FUNCTIONAL ADAPTER FOR A CONSUMER ELECTRONIC DEVICE

(75) Inventors: Richard A. McCoy, Stevensville, MI (US); Stephen D. Krefman, Paw Paw, MI (US); Ameresh Viswanathan, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 530 days.

(21) Appl. No.: 11/619,718

(22) Filed: Jan. 4, 2007

(65) Prior Publication Data

US 2008/0168205 A1 Jul. 10, 2008

(51) Int. Cl.
*G06F 3/00* (2006.01)

(52) U.S. Cl. ............... 710/2; 710/7; 710/62; 710/67

(58) Field of Classification Search .................. None
See application file for complete search history.

(56) References Cited

U.S. PATENT DOCUMENTS

| | | | |
|---|---|---|---|
| 2,795,639 | A | 6/1957 | Rawson |
| 3,054,024 | A | 9/1962 | Van Dillen et al. |
| 3,836,221 | A | 9/1974 | Whistler, Jr. et al. |
| 3,858,091 | A | 12/1974 | Wilkinson |
| D273,836 | S | 5/1984 | Ohyama et al. |
| 4,546,267 | A | 10/1985 | Urfirer |
| 4,628,351 | A | 12/1986 | Heo |
| 4,691,195 | A | 9/1987 | Sigelman et al. |
| 4,773,032 | A | 9/1988 | Uehara et al. |
| 4,884,626 | A | 12/1989 | Filipowski |
| 4,969,830 | A | 11/1990 | Daly et al. |
| 5,173,686 | A | 12/1992 | Fujihara |
| 5,187,744 | A | 2/1993 | Richter |
| 5,235,822 | A | 8/1993 | Leonovich, Jr. |
| 5,305,381 | A | 4/1994 | Wang et al. |
| 5,351,417 | A | 10/1994 | Rubin |
| 5,382,939 | A | 1/1995 | Hong |
| 5,408,382 | A | 4/1995 | Schultz et al. |
| 5,457,745 | A | 10/1995 | Wang et al. |
| 5,544,010 | A | 8/1996 | Schultz et al. |

(Continued)

FOREIGN PATENT DOCUMENTS

CN 1683856 A 10/2005

(Continued)

OTHER PUBLICATIONS

Miller, Robert C., et al., Taking Handheld Devices to the Next Level, 2004, pp. 36-43.*

(Continued)

*Primary Examiner*—Eron J Sorrell
(74) *Attorney, Agent, or Firm*—Robert A. Bacon; McGarry Bair P.C.

(57) ABSTRACT

A modular system comprising a host, a consumer electronic device, and an adapter coupling the consumer electronic device to the host. The adapter performs a first function of supplying at least one service provided by one of the host and the consumer electronic device to the other of the host and the consumer electronic device, and a second function. The second function can be different from the first function. The second function can be unrelated to the supply of a service.

25 Claims, 17 Drawing Sheets

U.S. PATENT DOCUMENTS

| | | |
|---|---|---|
| 5,568,691 A | 10/1996 | Rubin |
| 5,644,471 A | 7/1997 | Schultz et al. |
| 5,699,226 A | 12/1997 | Cavello |
| 5,739,665 A | 4/1998 | Bares |
| 5,810,168 A | 9/1998 | Eggering |
| 5,836,563 A | 11/1998 | Hsin-Yung et al. |
| 5,839,097 A | 11/1998 | Klausner |
| 5,864,120 A | 1/1999 | Vroom et al. |
| 5,996,956 A | 12/1999 | Shawver |
| 5,999,226 A | 12/1999 | Choi |
| 6,130,727 A | 10/2000 | Toyozumi |
| 6,131,812 A | 10/2000 | Schneider |
| 6,208,117 B1 | 3/2001 | Hibi |
| 6,231,371 B1 | 5/2001 | Helot |
| 6,246,575 B1 | 6/2001 | Barrus et al. |
| 6,309,230 B2 | 10/2001 | Helot |
| 6,359,270 B1 | 3/2002 | Bridson |
| 6,378,537 B1 | 4/2002 | DeHart |
| 6,393,848 B2 | 5/2002 | Roh et al. |
| 6,415,036 B1 | 7/2002 | Ritter et al. |
| 6,430,946 B2 | 8/2002 | Roh et al. |
| 6,453,687 B2 | 9/2002 | Sharood et al. |
| 6,480,753 B1 | 11/2002 | Calder et al. |
| 6,483,695 B1 | 11/2002 | Hartstein |
| 6,490,154 B2 | 12/2002 | Thompson |
| 6,519,144 B1 | 2/2003 | Henrie et al. |
| 6,557,756 B1 | 5/2003 | Smith |
| 6,559,882 B1 | 5/2003 | Kerchner |
| 6,608,399 B2 | 8/2003 | McConnell et al. |
| 6,634,910 B2 | 10/2003 | Lieb et al. |
| 6,646,866 B2 | 11/2003 | Kao |
| 6,682,161 B2 | 1/2004 | Yun |
| D486,467 S | 2/2004 | Yuen |
| 6,761,578 B1 | 7/2004 | Stavely et al. |
| 6,765,789 B2 | 7/2004 | Yang |
| 6,785,567 B2 | 8/2004 | Kato et al. |
| 6,788,529 B2 | 9/2004 | Homer et al. |
| 6,809,295 B1 | 10/2004 | Vargas |
| 6,832,618 B2 | 12/2004 | DeHart |
| 6,843,667 B2 | 1/2005 | Khoury |
| 6,853,399 B1 | 2/2005 | Gilman et al. |
| 6,860,764 B2 | 3/2005 | Khoury |
| 6,877,264 B2 | 4/2005 | Mautz |
| 6,927,871 B1 | 8/2005 | Silverbrook et al. |
| 6,961,239 B2 | 11/2005 | Schedivy |
| 6,963,936 B2 | 11/2005 | Billington et al. |
| 6,966,533 B1 | 11/2005 | Kalis et al. |
| 6,993,615 B2 | 1/2006 | Falcon |
| 7,034,902 B2 | 4/2006 | Tajima |
| 7,074,062 B2 | 7/2006 | Khoury |
| 7,080,812 B2 | 7/2006 | Wadsworth et al. |
| 7,090,141 B2 | 8/2006 | Roh et al. |
| 7,092,988 B1 | 8/2006 | Bogatin |
| 7,094,110 B1 | 8/2006 | Shelton |
| 7,117,286 B2 | 10/2006 | Falcon |
| 7,126,569 B2 | 10/2006 | Ootsuka et al. |
| 7,136,940 B2 | 11/2006 | Roh et al. |
| 7,146,306 B2 | 12/2006 | Whitney |
| 7,158,092 B2 | 1/2007 | Shen et al. |
| 7,219,942 B2 | 5/2007 | Schedivy |
| 7,272,420 B2 | 9/2007 | Falcon et al. |
| 7,404,298 B2 | 7/2008 | Kim et al. |
| 7,430,111 B2 | 9/2008 | Lee et al. |
| 2002/0080273 A1 | 6/2002 | Harrison et al. |
| 2002/0115353 A1 | 8/2002 | Zeiler et al. |
| 2002/0115480 A1 | 8/2002 | Huang |
| 2002/0186329 A1 | 12/2002 | Tong et al. |
| 2003/0103023 A1 | 6/2003 | Ootsuka et al. |
| 2003/0207623 A1 | 11/2003 | Patel |
| 2004/0004807 A1 | 1/2004 | Kim et al. |
| 2004/0070696 A1 | 4/2004 | Roh et al. |
| 2004/0093379 A1 | 5/2004 | Roh et al. |
| 2004/0154318 A1 | 8/2004 | Roh et al. |
| 2004/0177624 A1 | 9/2004 | Wo |
| 2004/0186596 A1 | 9/2004 | Roh |
| 2004/0216471 A1 | 11/2004 | Kim et al. |
| 2004/0262185 A1 | 12/2004 | Mills |
| 2005/0013103 A1 | 1/2005 | Chandley |
| 2005/0097912 A1 | 5/2005 | Nam et al. |
| 2005/0127870 A1 | 6/2005 | Shin |
| 2005/0129263 A1 | 6/2005 | Tamura et al. |
| 2005/0134472 A1 | 6/2005 | Jang et al. |
| 2005/0138948 A1 | 6/2005 | Lee |
| 2005/0138949 A1 | 6/2005 | Jang et al. |
| 2005/0201067 A1 | 9/2005 | Hu et al. |
| 2005/0210168 A1 | 9/2005 | Chen et al. |
| 2005/0225292 A1 | 10/2005 | Damlamian |
| 2005/0286900 A1 | 12/2005 | Bentley et al. |
| 2006/0007357 A1 | 1/2006 | Lee |
| 2006/0021360 A1 | 2/2006 | Kim et al. |
| 2006/0031617 A1 | 2/2006 | Falcon |
| 2006/0055553 A1 | 3/2006 | Yeh |
| 2006/0096303 A1 | 5/2006 | Kavounas |
| 2006/0106965 A1 | 5/2006 | Falcon |
| 2006/0116177 A1 | 6/2006 | Kortum |
| 2006/0117810 A1 | 6/2006 | Kendall et al. |
| 2006/0118694 A1 | 6/2006 | Lee et al. |
| 2006/0125360 A1 | 6/2006 | Kim et al. |
| 2006/0130078 A1 | 6/2006 | Zhang |
| 2006/0144056 A1 | 7/2006 | Oh |
| 2006/0145576 A1 | 7/2006 | Lee et al. |
| 2006/0148575 A1 | 7/2006 | Vitito |
| 2006/0217600 A1 | 9/2006 | Lee et al. |
| 2006/0224050 A1 | 10/2006 | Lee et al. |
| 2006/0261220 A1 | 11/2006 | Lee et al. |
| 2007/0038434 A1* | 2/2007 | Cvetko ............ 703/23 |
| 2007/0044497 A1 | 3/2007 | Roo et al. |
| 2007/0086151 A1 | 4/2007 | Oh et al. |
| 2007/0118862 A1 | 5/2007 | Jeong et al. |
| 2007/0126413 A1 | 6/2007 | Oh |
| 2007/0230910 A1 | 10/2007 | Welch et al. |
| 2008/0013284 A1 | 1/2008 | Nagahashi |
| 2008/0019082 A1* | 1/2008 | Krieger et al. ............ 361/679 |
| 2008/0101645 A1 | 5/2008 | Rosen |
| 2008/0165504 A1 | 7/2008 | McCoy et al. |
| 2008/0192411 A1* | 8/2008 | McCoy ............ 361/679 |

FOREIGN PATENT DOCUMENTS

| | | |
|---|---|---|
| CN | 1683877 | 10/2005 |
| CN | 1683893 A | 10/2005 |
| DE | 3528659 A1 | 2/1987 |
| DE | 19644641 | 4/1998 |
| DE | 19706565 A1 | 8/1998 |
| DE | 19800212 A1 | 7/1999 |
| DE | 19839174 A1 | 3/2000 |
| DE | 10242678 | 4/2004 |
| DE | 102005021937 A1 | 11/2006 |
| EP | 0985884 A | 3/2000 |
| EP | 1039441 | 9/2000 |
| EP | 1125537 A1 | 8/2001 |
| EP | 1152202 | 11/2001 |
| EP | 1205719 | 5/2002 |
| EP | 1258991 A | 11/2002 |
| EP | 1450105 A | 8/2004 |
| EP | 1384965 A | 12/2004 |
| EP | 1600886 A1 | 11/2005 |
| GB | 828064 | 2/1960 |
| GB | 2386177 A | 9/2003 |
| JP | 7318237 | 12/1995 |
| JP | 2000113315 A | 4/2000 |
| JP | 2000274923 | 10/2000 |
| JP | 2001289555 | 10/2001 |
| JP | 2001324258 | 11/2001 |

| | | | |
|---|---|---|---|
| JP | 2002011274 A | 1/2002 | |
| JP | 2002243354 | 8/2002 | |
| JP | 2002323858 | 11/2002 | |
| JP | 2003065659 A | 3/2003 | |
| JP | 2003302138 A | 10/2003 | |
| JP | 2003319573 A2 | 11/2003 | |
| JP | 2003323232 | 11/2003 | |
| KR | 2004025403 | 9/2002 | |
| KR | 20030077254 | 10/2003 | |
| KR | 2006074787 | 12/2004 | |
| KR | 20050059869 A | 6/2005 | |
| KR | 20050070958 | 7/2005 | |
| KR | 20050075781 | 7/2005 | |
| KR | 20050094242 | 9/2005 | |
| KR | 2008057639 | 12/2006 | |
| KR | 20070004351 | 1/2007 | |
| KR | 20080004129 | 1/2008 | |
| WO | 9622718 | 8/1996 | |
| WO | 9750045 A | 12/1997 | |
| WO | WO-99/01971 | 1/1999 | |
| WO | 2004051164 A1 | 6/2004 | |
| WO | 2004083658 | 9/2004 | |
| WO | 2004105184 A2 | 12/2004 | |
| WO | 2005047786 A1 | 5/2005 | |
| WO | 2005057105 A1 | 6/2005 | |
| WO | 2006067530 A1 | 6/2006 | |
| WO | 2006068456 | 6/2006 | |
| WO | WO-2006086371 | 8/2006 | |
| WO | 2007030664 A | 3/2007 | |

OTHER PUBLICATIONS

International Search Report PCT/US2008/050183 dated Jan. 4, 2008.
International Search Report PCT/US2008/050147 dated Jan. 3, 2008.
Article entitled "Johnson Controls' All-New Overhead Rail System Debuts in Ford F-150 Pickup Truck at North American International Auto Show"—www.prnewswire.com (2 pages).
Article entitled "Ford's F-150: The Winner And Still Champion?" by Christopher A. Sawyer—www.autofieldguide.com (4 pages).
"i-enabled Appliances", copyright 2001 Whirlpool Corporation, 14 pages, authored by Whirlpool Corporation, published during 2001 by Whirlpool Corporation as a self contained pamphlet. The year of publication is sufficiently earlier than the effective U.S. filing date and any foreign priority date so that the particular month of publication is not in issue.
Written answers to questions about the substance of the disclosure of JP200306569 submitted to a Japanese/English translator. (No translation was requested or provided).
International Search Report for PCT/US2008/050164.
Written Opinion for PCT/US2008/050164.
Corrected International Search Report for PCT/US2008/050164.
Corrected Written Opinion for PCT/US2008/050164.
International Search Report forPCT/US2008/050145.
Written Opinion for PCT/US2008/050145.
International Search Report for PCT/US2008/050159.
Written Opinion for PCT/US2008/050159.
International Search Report for PCT/US2008/050154.
Written Opinion for PCT/US2008/050154.
International Search Report for PCT/US2008/050170.
Written Opinion for PCT/US2008/050170.
Declaration of Non-Establishment of ISR for PCT/US2008/050174.
Written Opinion for PCT/US2008/050174.
International Search Report for PCT/US2008/050181.
Written Opinion for PCT/US2008/050181.
Office Action for U.S. Appl. No. 11/619,731, Dated Feb. 6, 2008 (8 pages).
Office Action for U.S. Appl. No. 11/619,731, Dated Feb. 26, 2008 (8 pages).
"i-Enabled Appliances", copyright 2001 Whirlpool Corporation.

* cited by examiner

US 7,765,332 B2

FUNCTIONAL ADAPTER FOR A CONSUMER ELECTRONIC DEVICE

BACKGROUND OF THE INVENTION

1. Field of the Invention

The invention relates to an adapter for coupling a consumer electronic device to a host or an appliance.

2. Description of the Related Art

Traditionally, appliances, consumer electronic devices, and other useful household machinery is located in a room dedicated to the function supported by the appliance, consumer electronic device, or household machinery. For example, the kitchen has traditionally been limited to a space for preparing and eating meals and consequently has been mostly occupied by cabinetry and large home appliances such as refrigerators, dishwashers, and ovens. The family room has been designated as a place for leisure activities, and so most entertainment devices, such as televisions and video games are commonly found here. Laundry rooms normally house a washer, dryer, and iron. Devices such as personal computers and printers are often located in another room, such as a dedicated home office or bedroom.

Consumers increasingly own multiple hand-held or portable consumer electronic devices, such as laptops, cell phones, PDAs, and digital music players. These devices are typically used in many different rooms in the house and are often carried from room to room throughout the home. Consumers also tend to perform non-traditional tasks in the traditional rooms of the home. For example, consumers also tend to eat in the living room or media room, instead of the dining room. Consumers tend to eat, meet and entertain in the kitchen, not just the dining room and family room. In fact, the kitchen is often the hub of most household activity. Consumers also tend to work in every room of the home with the adoption of laptop computers and wireless networks.

Therefore, there is a trend for consumers to perform non-traditional functions in a household room designed for a traditional function. The invention recognizes this trend and attempts to support the trend.

SUMMARY OF THE INVENTION

The invention supports this trend by providing a modular system, according to one embodiment of the invention, comprising a host performing a primary function; a consumer electronic device; and an adapter removably coupled to the host and performing a first function of supplying at least one service provided by one of the host and the consumer electronic device to the other of the host and the consumer electronic device, and a second function different from the first function.

According to another embodiment of the invention, a modular system comprises a host performing a primary function; a consumer electronic device; and an adapter performing a first function of supplying at least one service provided by one of the host and the consumer electronic device to the other of the host and the consumer electronic device, and a second function unrelated to the supply of a service.

According to yet another embodiment of the invention, a modular system for use with a host performing a primary function comprises a consumer electronic device and an adapter adapted to be removably coupled to the host and to removably hold the consumer electronic device such as to removably couple the consumer electronic device to the host, and further performing a first function of supplying at least one service selected from a power service and a data service provided by one of the host and the consumer electronic device to the other of the host and the consumer electronic device, and a second function unrelated to the supply of the service.

DESCRIPTION OF THE EMBODIMENTS OF THE INVENTION

Figure 1:
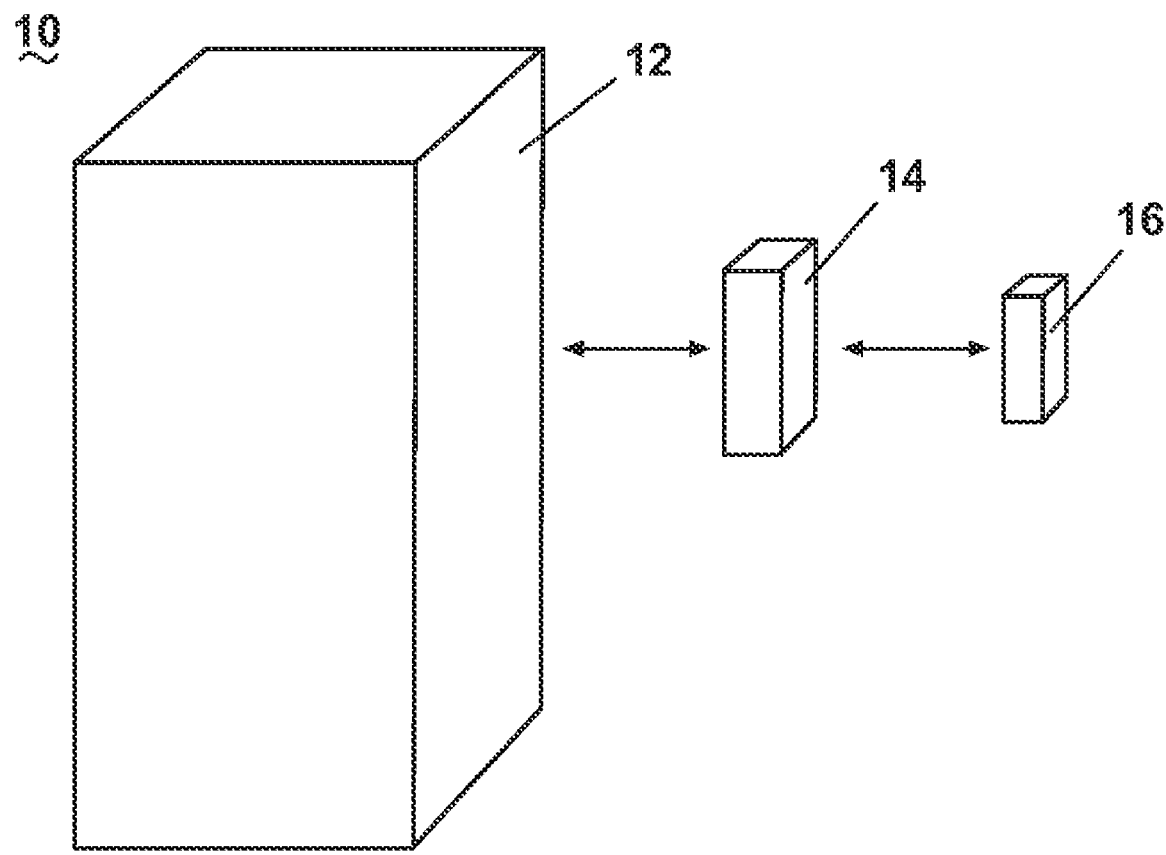
FIG. 1 is a schematic illustration of a modular system comprising a host, an adapter, and a consumer electronic device.

Referring to FIG. 1, a schematic illustration of a modular system 10 according to the invention is shown and comprises at least one host 12, at least one functional adapter 14, and at least one consumer electronic device 16. The host 12 and the consumer electronic device 16 cannot be directly coupled with each other, and thus are indirectly coupled via the adapter 14. The term "coupled" as used herein includes any type of connection that permits a transfer of a service, as hereinafter defined, between any combination of the host 12, adapter 14, and consumer electronic device 16. The term "coupled" includes both a fixed and removable coupling, unless expressly stated otherwise.

The host 12 performs a primary function and can provide or receive at least one service to or from the adapter 14 or the consumer electronic device 16. The host 12 can be an appliance and the primary function can be performing a series of steps to conduct a useful cycle of operation. The host 12 can also comprise a structural feature of a building, such as a wall. Preferably, the appliance is a conventional household appliance, such as a refrigerator performing a cooling cycle or an ice making cycle. Other examples of the host 12 include, but are not limited to a freezer, a microwave oven, a dishwashing machine, a stove, a range, an air conditioner, a dehumidifier, a water heater, a furnace, a clothes washing machine, a clothes dryer, a clothes refreshing machine, and a non-aqueous washing apparatus, or any combination thereof.

The consumer electronic device 16 is a device that also performs a primary function. In most cases, the primary function of the consumer electronic device is different from the primary function performed by the host 12. Examples of the consumer electronic device 16 include, but are not limited to a television, a video camera, a video recorder, a personal computer, a notebook computer, a computer monitor, a video display, a keyboard, a printer, copying equipment, a calculator, a facsimile machine, a scanner, a digital storage device, a wireless transceiver, an internet router, a power supply, a data recorder, an answering machine, a telephone, a cordless telephone, a cellular telephone, a video game system, a personal digital assistant, a DVD player, VHS player, a VCR, a cassette deck, an 8 mm video player, a CD player, a Blackberry, a portable digital video player, an MP3 player, a radio, other music players, an audio speaker, a digital picture frame, a weather station, and a scale or balance.

The consumer electronic device can be provided with a user interface to enable the user to interact with the consumer electronic device 16 or receive a functional output from the consumer electronic device. The user interface can comprise a video display, a touch screen, control knobs or buttons, a data display, a keypad, a printer or facsimile page output, a microphone, a speaker, a video or still camera, and the like.

The adapter 14 supplies at least one service to either the host 12 or the consumer electronic device 16. The supply of the service can be uni-directional in that the adapter 14 supplies a service provided by one of the host 12 and the consumer electronic device 16 to the other of the host 12 and the consumer electronic device 16. The supply of the service can also be bi-directional in that the adapter 14 can supply a service from the host 12 to the consumer electronic device 16 and from the consumer electronic device 16 to the host 12. The adapter 14 itself can provide a service that is supplied to the host 12, the consumer electronic device 16 or both, either uni-directionally or multi-directionally. The service supplied by the adapter 14 can be of the same type or a different type than that supplied by either the host 12 or the consumer electronic device 16.

An adapter 14 can comprise one or more adapter members. Exemplary types of adapters members can include, but are not limited to, extenders and device holders. In general, an extender extends the service provided by the host 12, the adapter 14, or the consumer electronic device 16. An extender can be coupled between the host 12 and another adapter 14, between the host 12 and a consumer electronic device 16, between two other adapters 14, or between another adapter 14 and a consumer electronic device 16 to extend the service.

Extenders are useful to allow an adapter 14 to be coupled to one surface of the host 12, while the consumer electronic device 16 is coupled to a different surface of the host 12 or to simply increase the distance between the host 12 and the consumer electronic device 16. Device holders physically support a consumer electronic device 16 and can be used alone or in combination with an extender.

Exemplary services that the adapter 14 can supply include mechanical communication, power communication, and data communication. Mechanical communication is the physical coupling of two objects, such as between any combination of the host 12, the adapter 14, and the consumer electronic device 16. The mechanical communication includes direct and indirect physical mounting, unless expressly stated otherwise. Physical coupling includes a fixed or removable mounting, unless expressly stated otherwise. Power communication is the coupling of two objects to supply power to at least one of the objects. Data communication is the coupling of two objects to transmit data to at least one of the objects or exchange data between the objects. The mechanical, power, and data communication includes both uni-directional and multi-directional communication, unless stated otherwise, between any combination of the host, adapter, and consumer electronic device. The power and data communication includes wired and wireless communication, unless stated otherwise.

Illustrative applications of these services include the physical mounting of the consumer electronic device 16 to either the host 12 or adapter 14 to place them in mechanical communication with each other. Power communication can include supplying power to the consumer electronic device 16 from either the host 12 or adapter 14 during operation as well as charging a consumer electronic device 16 for later use. Wireless power communication can comprise any types of wireless power communication, including, without limitation for illustration purposes, microwave transmission, laser transmission, and magnetic fields. Data communication can include exchanging data between the host 12 or the adapter 14 and the consumer electronic device 16. Wireless data communication can comprise any type of wireless data communication, including, without limitation for illustration purposes, wireless network (a/k/a Wi-Fi), radio transmission, light transmission, and acoustical transmission.

Each service can comprise multiple categories of the service, where one category of a service is different in some way from another category of the same service. As an example, two possible categories of mechanical communication are hanging a consumer electronic device 16 as opposed to docking the consumer electronic device 16. Exemplary categories of power communication include the type of power, e.g. AC or DC, supplied to the consumer electronic device 16 and variations in the characteristics of the power, such as the voltage or current. Exemplary categories of data communication include encrypted/unencrypted. Data communication also includes communication for different protocols, including physical layer protocols and software layer protocols. Examples for physical layer protocols are a wired Ethernet and a wireless (Wi-Fi) network, both of which support the same data packet structure. The adapter 14 could effect communication between these two physical layers. Examples of software layer protocol are Zigbee and Bluetooth. The adapter 14 can be used to transform either of the Zigbee and Bluetooth data packets into the other of the Zigbee and Bluetooth data packets to effect communication between devices using a different protocol.

The adapter 14 can be configured to transform the service that it supplies. For example, the adapter 14 could be configured to transform the power supplied by changing the voltage or the amount of available power. An anticipated transformation would be to change the voltage of the supplied power form voltage that is supplied to the adapter. Another anticipated transformation is the changing of AC power to DC. The data communication could be transformed such that the adapter 14 changes unencrypted data to encrypted data or a standard communication protocol to a proprietary protocol. Other anticipated transformations include the changing from wired power to wireless power, from wired data to wireless data, or from standard power or standard data to power with imbedded data.

The service supplied by the adapter 14 can be provided at least in part by the host 12. For example, the mechanical communication for the consumer electronic device 16 can be provided in part by a horizontal or vertical surface of the host 12, the power supplied by the adapter 14 can be provided through a power connection between the host 12 and an external power source, such as a mains electricity supply, and the data transferred by the adapter 14 can by provided by the host 12, such as from the host controller, or through a data connection between the host 12 and an external source, such as a computer network, a telecommunication network, or another appliance.

Alternately, the service supplied by the adapter 14 can be provided at least in part by the use environment. The use environment, as used herein, is the area surrounding the host 12. For example, in the case where the host 12 is an appliance, the use environment can be a nearby wall of a building or similar structural feature. The use environment can include sources of power and data, such as a mains electricity supply or a computer network.

The term "provide," and any variation thereof, as used herein denotes the source of the service relative to the modular system 10, and is not limited to the "provider" being the origin of the service. In other words, providing is used to denote the source of the service relative to the host 12, the adapter 14, and the consumer electronic device 16, regardless of whether the service originates with the object that provides the service. The object that provides the service can simply be passing on the service. For example, for a host 12 comprising an appliance that provides the service of power communication, the appliance can simply pass on electricity it receives from a household outlet. However, the same appliance can provide another service that originates with the appliance, such as mechanical communication where an adapter 14 and a consumer electronic device 16 are physically coupled to the appliance. Moreover, the object that the service is provided to is not necessarily the end receiver of the service. The service can simply be transmitted through the object that is provided with the service. An object, such as the adapter 14, can be provided with the service, such as from the host 12, and can transmit or supply the service, such as to the consumer electronic device 16.

The host 12 and the consumer electronic device 16 each comprise at least one service interface, respectively referred to herein as a host service interface and a device service interface. The service interfaces can be integrally formed with the host 12 or consumer electronic device 16, or it can be an add-on member. The service interfaces can be removable or non-removable from the host 12 or consumer electronic device 16. At least one service can be provided to the adapter 14 through the host service interface, the device service interface, or both, and the adapter 14 can in turn supply that service through the other of the host service interface and the device service interface. As an example, for a uni-directional service where the service is provided to from the host 12 to the consumer electronic device 16 via the adapter 14, the service can be supplied to the adapter 14 through the host service interface, and to the consumer electronic device 16 through the device service interface.

While the device service interface and host service interface can be the same, it is anticipated that the device service interface is different from the host service interface. The term "different", when used to describe the host and device service interfaces, means that the host service interface and device service interface cannot be directly coupled, or if directly coupled, one or both of the interfaces lose some functionality. Different can also mean that the two service interfaces are incompatible. An anticipated type of difference is that the host service interface and the device service interface will have different physical connectors for one or more of the services, thereby needing the adapter 14 to couple the physical connectors to establish the appropriate communication for the service.

The adapter 14 can comprise at least one functionality other than supplying the service between the host 12 and consumer electronic device 16. The adapter functionality can operate independently of the host 12 and the consumer electronic device 16, or it can enhance one or more of the functions of the host 12 and the consumer electronic device 16. The functionality can be dependent upon whether the adapter 14 is coupled with the host 12, and also on whether the consumer electronic device 16 is coupled with the adapter. The functionality can permit the adapter 14 and/or the consumer electronic device 16 to be used independently of the host 12. In this case, the adapter 14 often provides and supplies at least one service to the consumer electronic device 16.

Examples of adapter functionality include, but are not limited to, a speaker, a user interface, a display projection, a media manager, a whiteboard, physical storage, application software hosting, communications routing, power storage, microphone, data storage, and consumer electronic device. An adapter 14 with speaker functionality comprises at least one audio speaker that intensifies and makes speech or music audible. An adapter 14 with user interface functionality comprises a display and/or an input area that allows to user to interface with the host 12, adapter 14, consumer electronic device 16, or an external source. An adapter 14 with calendar projection functionality allows a calendar or schedule to be projected visually or audibly. An adapter with media manager functionality allows a user to manage all types of media (e.g. music, video, pictures, etc.). An adapter 14 with whiteboard functionality comprises a conventional whiteboard for temporarily writing messages, and can be available to the user only when a consumer electronic device 16 is not coupled to the adapter 14, or can be available at all times to the user. An adapter 14 with physical storage functionality comprises a storage compartment for storing items, and may be particularity useful for storing companion items for the consumer electronic devices, such as a remote control for a consumer electronic device comprising a television or DVDs for a consumer electronic device comprising a DVD player. An adapter 14 with power storage functionality comprises a source of stored power, such as a rechargeable battery. An adapter with data storage functionality comprises means for storing data, such as a hard drive. An adapter with consumer electronic device functionality incorporates the entire functionality of one or more consumer electronic device as a function of the adapter.

An adapter 14 can comprise more than one type of functionality. For example, whiteboard functionality can be combined with physical storage functionality for storing items commonly associated with whiteboards, such as dry-erase markers and erasers.

The adapter 14 can further comprise at least one component that enables a service to be supplied between the host 12 and the consumer electronic device 16. An adapter component can provide, supply, or receive at least one service. A single adapter component can enable the supply of only one service to the consumer electronic device 16 or it can enable the supply of multiple services to the consumer electronic device 16. The adapter 14 can be provided with multiple adapter components that each enable the supply of a different service to the consumer electronic device 16. One or more adapter components can form an adapter service interface, similar to a host or device service interface, and can couple with a host service interface, a device service interface, or another adapter service interface to provide, transmit, or supply at least one service.

The adapter 14 can further comprise at least one component that enables the adapter 14 to perform a function other than supplying the service between the host 12 and the consumer electronic device 16. A single adapter component can enable the adapter 14 to perform only one function or it can enable the adapter 14 to perform multiple different functions. The adapter 14 can be provided with multiple adapter components that each enable the adapter 14 to perform a different function.

An adapter component can couple with the host 12, the consumer electronic device 16, or neither. An adapter component can comprise a connector component such as a connector component that forms a part of an adapter service interface, that enables the supply of the service through a physical coupling with the host 12, consumer electronic device 16, or another adapter 14, e.g. a plug fitting into a socket to enable power delivery, or through a non-physical coupling with the host 12, consumer electronic device 16, or another adapter 14, e.g. establishing a wireless connection to enable data transfer. An adapter component can comprise a transformative component such as an electrical transformer to change the voltage of the power or an inverter to change the type of power. An adapter component can comprise an adapter service interface that couples with a host service interface or a device service interface. An adapter component can comprise a functional component that imparts functionality to the adapter 14.

It is anticipated that a common implementation will include a single host 12, a single adapter 14, and a single consumer electronic device 16. However, it is within the scope of the invention for one or all of the host 12, adapter 14, and consumer electronic device 16 to be in a plural arrangement. An illustrative example includes multiple hosts 12 concurrently coupled to one consumer electronic device 16 by one or more adapters 14. Another illustrative example includes multiple consumer electronic devices 16 coupled to a single host 12 by one or more adapters 14.

For a modular system comprising multiple hosts 12, each host 12 can be provided with a common, standardized host interface. For example, competing home appliance manufactures may have different host interfaces, but each manufacturer may carry the same standardized host interface throughout its own line of home appliances. For a modular system with multiple adapters 14 and a single host 12, the host 12 can interchangeably couple with any one of the adapters 14. The multiple adapters 14 preferably have a standardized component that is received by the host interface so that the host 12 can interchangeably receive the adapters. Manufacturers of consumer electronic devices may also choose to carry a standardized device interface throughout its own line of consumer electronic devices 16. Therefore, different adapters 14 can be provided for coupling the standardized interface for a consumer electronic device 16 of one manufacturer to the standardized interface of an appliance for another manufacturer and enabling the communication of a service there between. This eliminates the need for all manufacturers to use the same standardized interface, and increases the utility of the appliances and the consumer electronic devices 16.

Specific embodiments of modular systems containing these features, as well as some additional features will now be described. Other examples of modular systems are described in the following related applications filed contemporaneously herewith: U.S. patent application Ser. No. 11/619,900, entitled "A System for Supplying Service from an Appliance to Multiple Consumer Electronic Devices"; U.S. patent application Ser. No. 11/619,754, entitled "A System for Connecting Dissimilar Consumer Electronic Devices to a Host"; U.S. patent application Ser. No. 11/619,836, entitled "An Appliance with an Adapter to Simultaneously Couple Multiple Consumer Electronic Devices"; U.S. patent application Ser. No. 11/619,907, entitled "An Appliance with an Adapter to Alternately Couple Multiple Consumer Electronic Devices"; U.S. patent application Ser. No. 11/619,922, entitled "An Appliance with a Removable Adapter and a Removable Consumer Electronic Device"; U.S. patent application Ser. No. 11/619,894, entitled "A Host with Multiple Adapters for Coupling Consumer Electronic Devices"; U.S. patent application Ser. No. 11/619,806, entitled "An Adapter for Coupling a Host and Consumer Electronic Device Having Dissimilar Standardized Interfaces"; U.S. patent application Ser. No. 11/619,817, entitled "A Host with Multiple Adapters for Multiple Consumer Electronic Devices"; U.S. patent application Ser. No. 11/619,845, entitled "Multiple Hosts with Multiple Adapters for Multiple Consumer Electronic Devices"; U.S. patent application Ser. No. 11/619,686, entitled "An Appliance Door with a Service Interface"; U.S. patent application Ser. No. 11/619,912, entitled "A Cabinet Door with a Service Interface"; U.S. patent application Ser. No. 11/619,873, entitled "A Refrigerator Dispenser with a Service Interface and Adapter for a Consumer Electronic Device"; U.S. patent application Ser. No. 11/619,904, entitled "A Service Supply Module and Adapter for a Consumer Electronic Device"; U.S. patent application Ser. No. 11/619,767, entitled "Host and Adapter for Docking a Consumer Electronic Device in Discrete Orientations"; U.S. patent application Ser. No. 11/619,772, entitled "Host and Adapter for Selectively Positioning a Consumer Electronic Display in Visible and Concealed Orientations"; U.S. patent application Ser. No. 11/619,775, entitled "Host and Adapter for Selectively Positioning a Consumer Electronic Device in Accessible and Inaccessible Orientations"; U.S. patent application Ser. No. 11/619,731, entitled "Adapter and Consumer Electronic Device Functional Unit"; U.S. patent application Ser. No. 11/650,222, entitled "Acoustic Chamber as Part of Adapter or Appliance"; and U.S. patent application Ser. No. 11/649,932, entitled "Electrical Accessory Charging Compartment for a Cabinet", all of which are incorporated herein by reference in their entirety.

In one aspect of the invention, the modular system can comprise a host, adapter, and consumer electronic device combination where the adapter supplies at least one service between the host and consumer electronic device while also providing additionally functionality, which may or may not be a service. This aspect is illustrated in the following embodiments.

Figure 2:
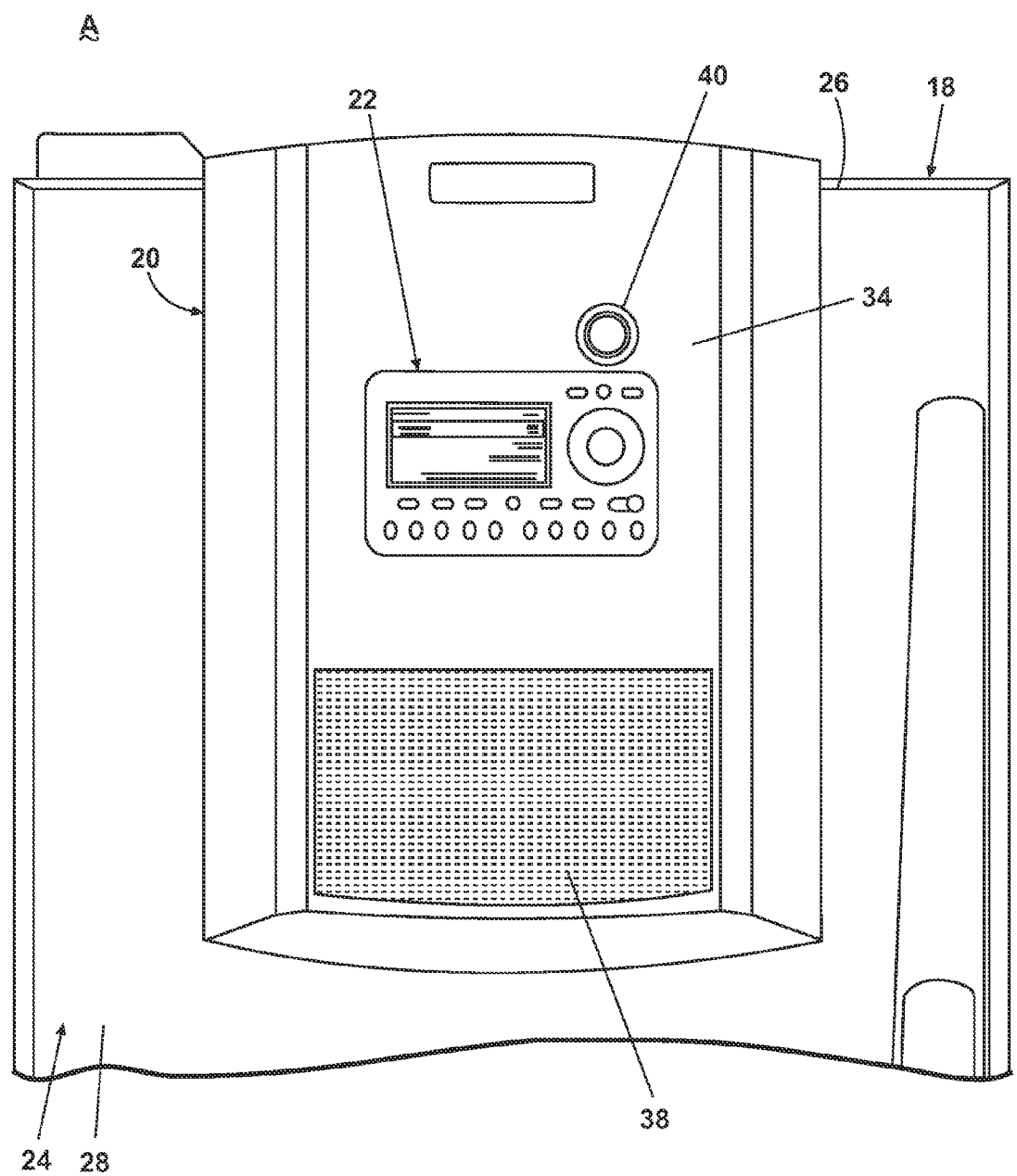
FIG. 2 is a front view of a first specific embodiment of a modular system, comprising a refrigerator with an adapter and a satellite radio.
Figure 3:
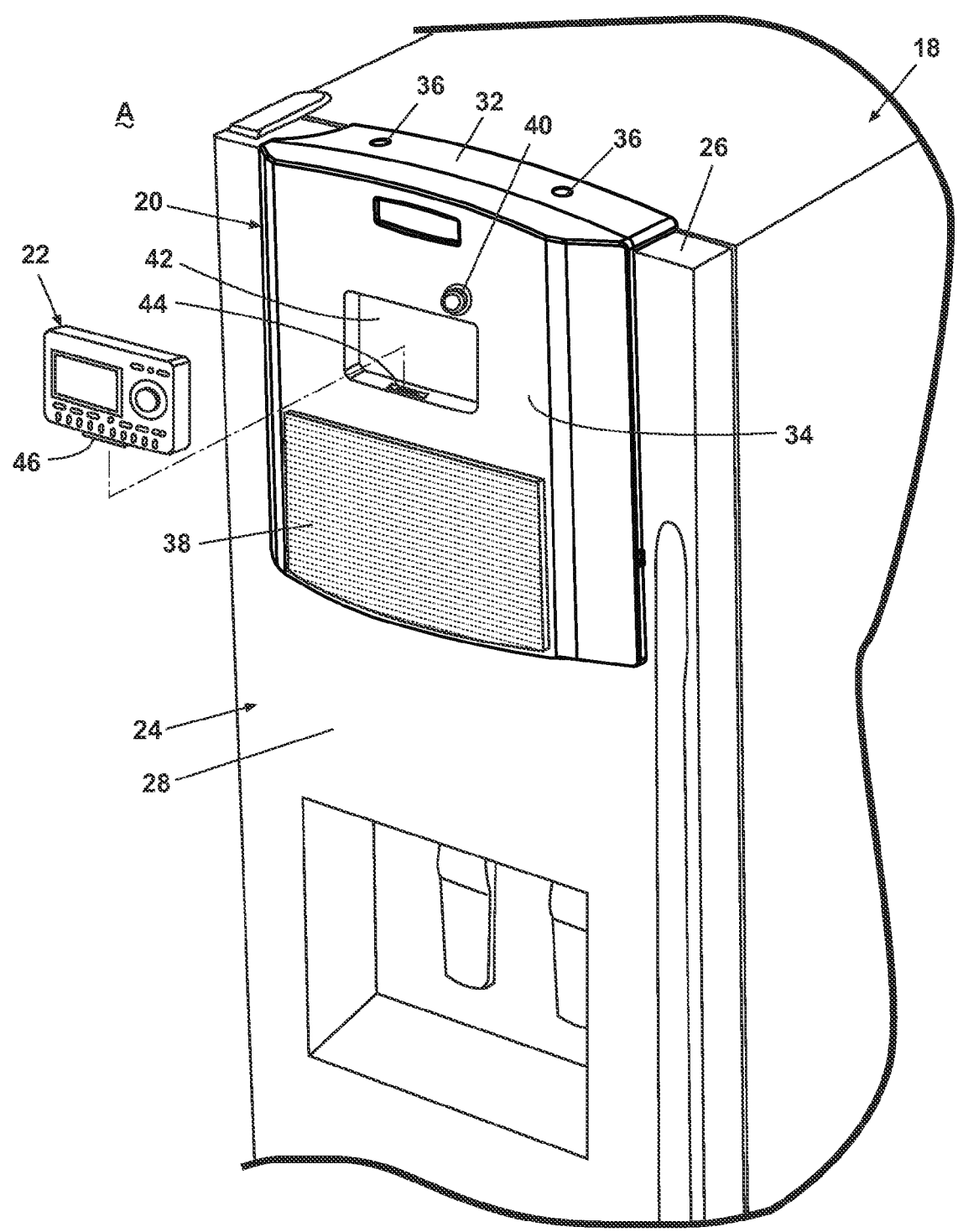
FIG. 3 is a partial exploded view of the modular system from FIG. 2.
Figure 3A:
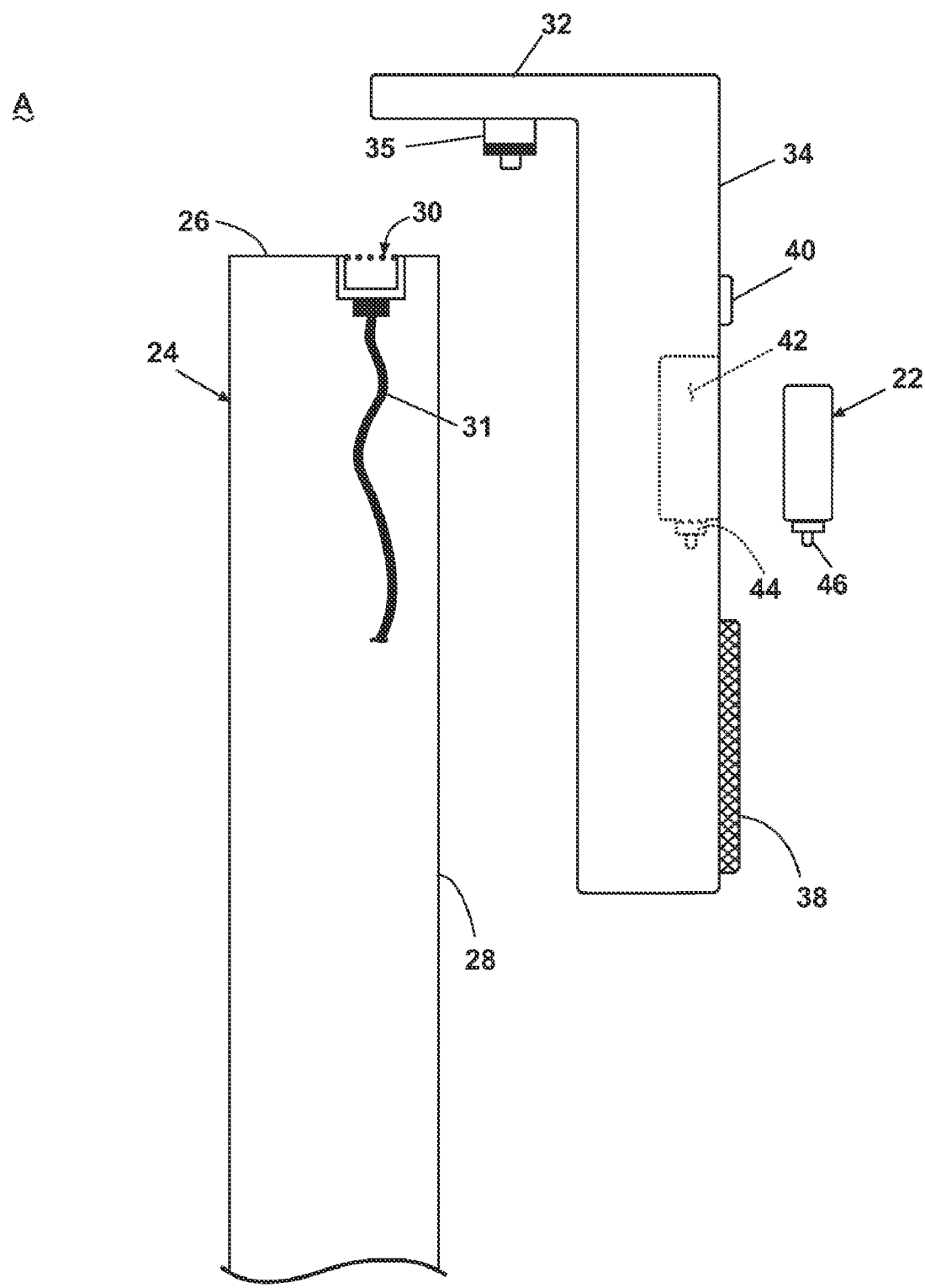
FIG. 3A is a schematic illustration of the connections between the modular system shown in FIG. 3.

Referring to FIGS. 2-3A, a first embodiment of the invention is shown, where a modular system A comprises a host in the form of a refrigerator 18, an adapter 20, and a consumer electronic device in the form of a satellite radio 22. The refrigerator 18 comprises a door 24 selectively closing a cooling compartment. The door 24 has a horizontal top surface 26 and a vertical front surface 28. A host service interface 30 is integrally formed in the top surface 26. Electrical power and data can be provided by the refrigerator 18, which can ultimately receive power from a household power source and data from an external data source such as a personal computer or a network connection, to the host service interface 30 through an electrical/data connection with the refrigerator, indicated by the wire 31 terminating in the host service interface 30.

The adapter 20 comprises a generally L-shaped housing, having a horizontal mounting bracket 32 joined to a vertical main body 34. The mounting bracket 32 comprises a downwardly depending service interface connector 35 that is configured to mate with the host service interface 30. The mounting bracket 32 is affixed to the top surface 26 of the refrigerator door 24 using screws 36 such that the main body 34 rests against the front surface 28, and the service interface connector 35 is received by the host service interface 30.

The adapter 20 further has speaker and user interface functionality. A speaker 38 is mounted to the main body 34 and can receive audio signals from the docked satellite radio 22 and transform the signals into audible sound. A user interface comprising a rotary encoder or potentiometer knob 40 is also mounted to the main body 34 and can adjust the volume of the sound projecting from the speaker 38. The adapter 20 can further comprise an internal acoustic chamber (not shown) that can be tuned to provide better speaker performance than is achieved without such a chamber.

The satellite radio 22 can be removably mounted within an open cavity 42 on the main body 34. The cavity 42 comprises an adapter service interface 44 that couples with a device service interface 46 on the satellite radio 22. The adapter service interface 44 is wired to the service interface connector 35 to provide power and data communication to the satellite radio 22 when the satellite radio 22 is coupled with the adapter 20 and the adapter 20 is coupled with the refrigerator. The adapter 20 can further comprise its own internal power and/or data source (not shown) so that the satellite radio 22 can receive power and/or data when the adapter 20 is not coupled with the refrigerator 18. The adapter service interface 44 is further wired to the speaker 38 so that audio signals from the docked satellite radio 22 can be transferred to the speaker 38. When the satellite radio 22 is docked within the cavity 42 by coupling the adapter and device service interfaces 44, 46, it automatically receives power and/or data from the power and/or data source, whether the source is the refrigerator 18 or the adapter 30, and is coupled to the speaker 38. The satellite radio 22 can also be removed from the adapter 20 and used elsewhere, such as with a vehicle stereo system.

Figure 3B:
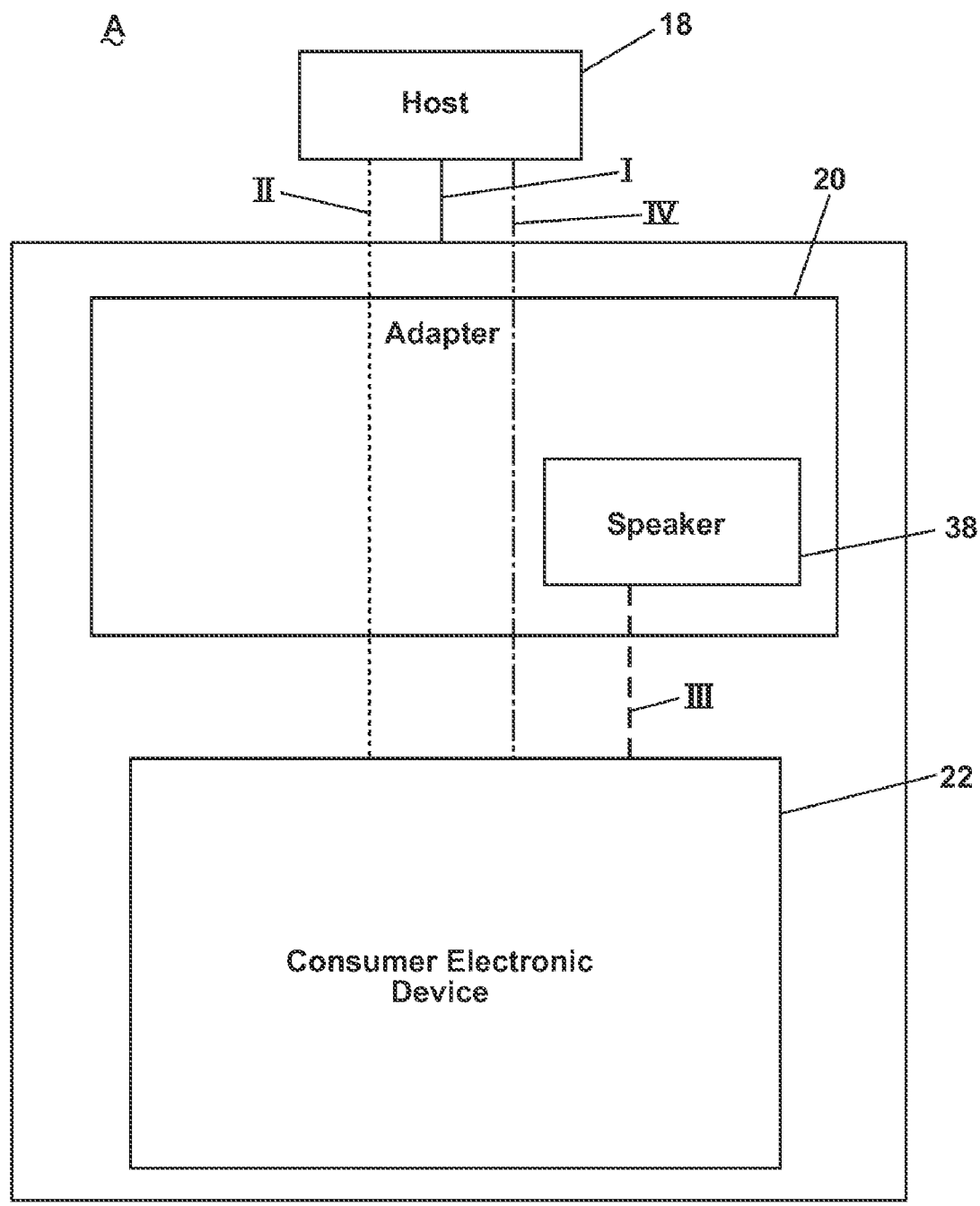
FIG. 3B is a schematic view of the modular system of FIG. 2 when the adapter and the satellite radio are coupled to the refrigerator.

The mechanical, power, and data communication in modular system A when the adapter 20 and the satellite radio 22 are coupled to the refrigerator 18 is illustrated schematically in FIG. 3B. In particular, the mounting bracket 32 and main body 34 supply the mechanical communication between the refrigerator 18 and the satellite radio 22, as indicated by the solid line I; the adapter 20 supplies power communication from the refrigerator 18, to the satellite radio 22, as indicated by the dotted line II; and, the adapter 20 supplied data communication from the satellite radio 22 to the speaker 38, as indicated by the dashed line III. Optionally, the adapter 20 can supply data communication from the refrigerator 18, to the satellite radio 22, as indicated by the dash-dot-dash line IV.

The speaker 38 provides additional functionality other than that provided by either the host or the consumer electronic device. In this way, the adapter 20 adds to the functionality provided by either the host or the consumer electronic device. The added functionality enhances the utility of the modular system for the end user.

Figure 4:
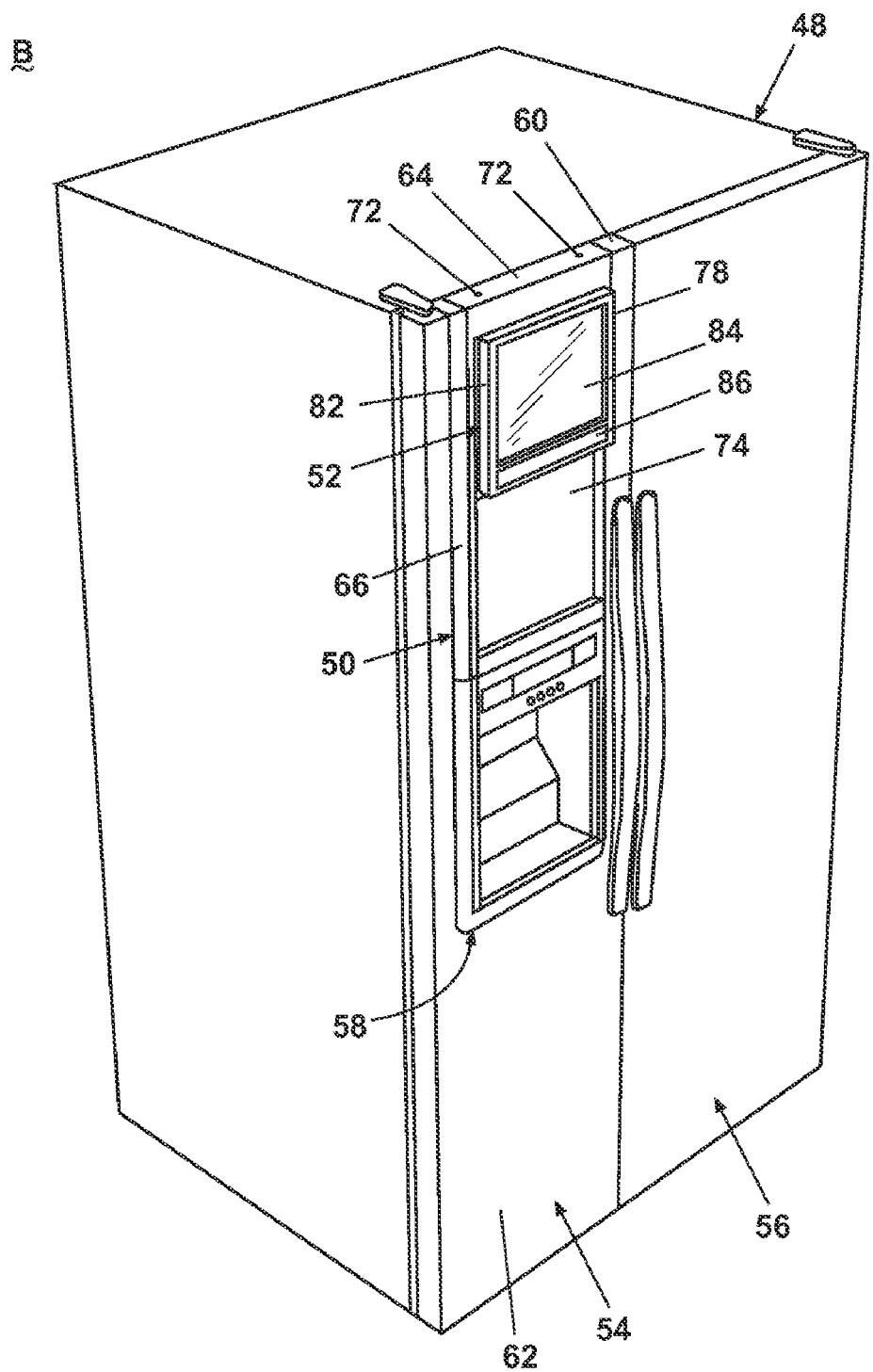
FIG. 4 is a perspective view of a second specific embodiment of a modular system, comprising a refrigerator, an adapter with whiteboard functionality and a video display.
Figure 5:
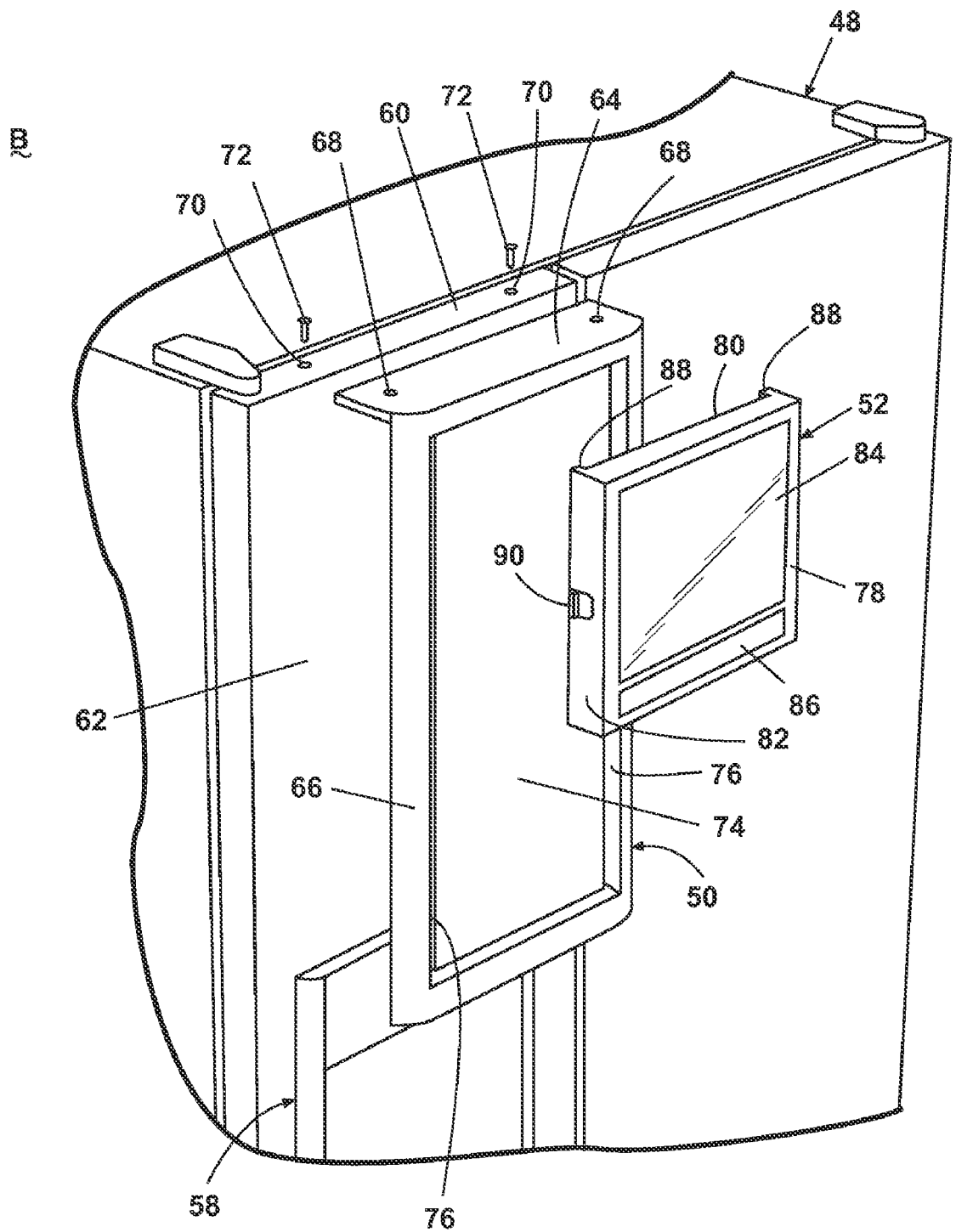
FIG. 5 is a close-up exploded view of the modular system from FIG. 4.
Figure 6:
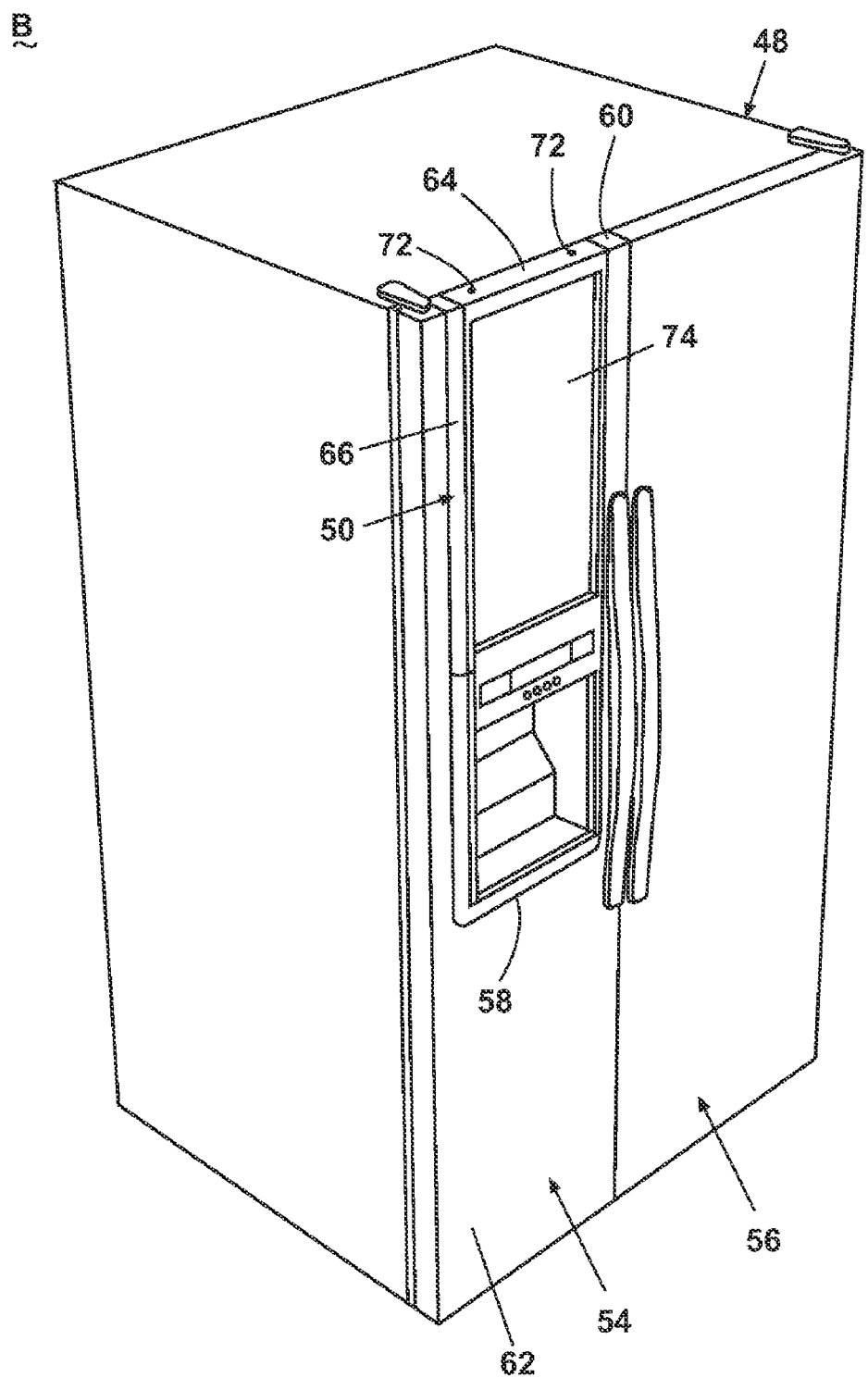
FIG. 6 is a perspective view of the modular system from FIG. 4, showing the video display removed from the refrigerator.

Referring to FIGS. 4-6, a second embodiment is shown, where a modular system B comprises a host in the form of a refrigerator 48, an adapter 50 having whiteboard functionality, and a consumer electronic device in the form of a video display 52. The refrigerator 48 comprises a pair of doors 54, 56 selectively closing a cooling compartment (not shown), with a dispenser 58 for selectively dispensing water and/or ice provided within the door 54. The door 54 further has a horizontal top surface 60 and a vertical front surface 62.

The adapter 50 comprises an L-shaped adapter housing having a generally horizontal mounting bracket 64 and a generally vertical main body 66 joined to the mounting bracket 64 at a right angle. The mounting bracket 64 is received on the top surface 60 of the door 54 so that the main body 66 rests against the front surface 62. The mounting bracket 64 comprises a pair of screw hole openings 68 that are aligned with corresponding screw holes 70 formed in the top surface 60, and each receives a mounting screw 72 to physically mount the adapter 50 to the refrigerator 48. The main body 66 is dimensioned so that when the adapter 50 is mounted to the refrigerator 48, the lower surface of the main body 66 abuts the upper surface of the dispenser 58. The main body 66 retains a whiteboard 74 and comprises two vertical grooves 76 on either side of the whiteboard 74 that are used to mount the video display 52 to the adapter 50.

The video display 52 comprises a front surface 78 and a rear surface 80 joined by a peripheral surface 82. A display screen 84 and a user interface 86 are provided on the front surface 78, and a pair of vertical projections 88 extend from the rear surface 80, and are configured to be received within the grooves 76 when the video display 52 is mounted to the adapter 50. The video display 52 further comprises a pair of resilient tabs 90 that are formed on the peripheral surface 82 and bias against the main body 66 to mechanically couple the video display 52 to the adapter 50. The projections 88 can slide within the grooves 76 to adjust the vertical height of the video display 52 and the resilient tabs 90 can maintain the video display 52 at any desired vertical height along the adapter 50. The video display 52 further comprises an internal source of power (not shown), such as a battery. Thus, the video display 52 is only supplied with the service of mechanical communication by the adapter 50.

Referring to FIG. 6, the video display 52 can be removed from the refrigerator 48 to expose the entire writing surface of the whiteboard 74, so that the adapter 50 comprises some functionality even when the video display 52 is removed from the refrigerator 48. Alternately, when the video display 52 is mounted to the whiteboard 74, only a portion of the writing surface is exposed, as shown in FIG. 4. While not illustrated herein, one or more additional consumer electronic devices can be mounted to the adapter 50 to completely cover the writing surface of the whiteboard 74.

Figure 7:
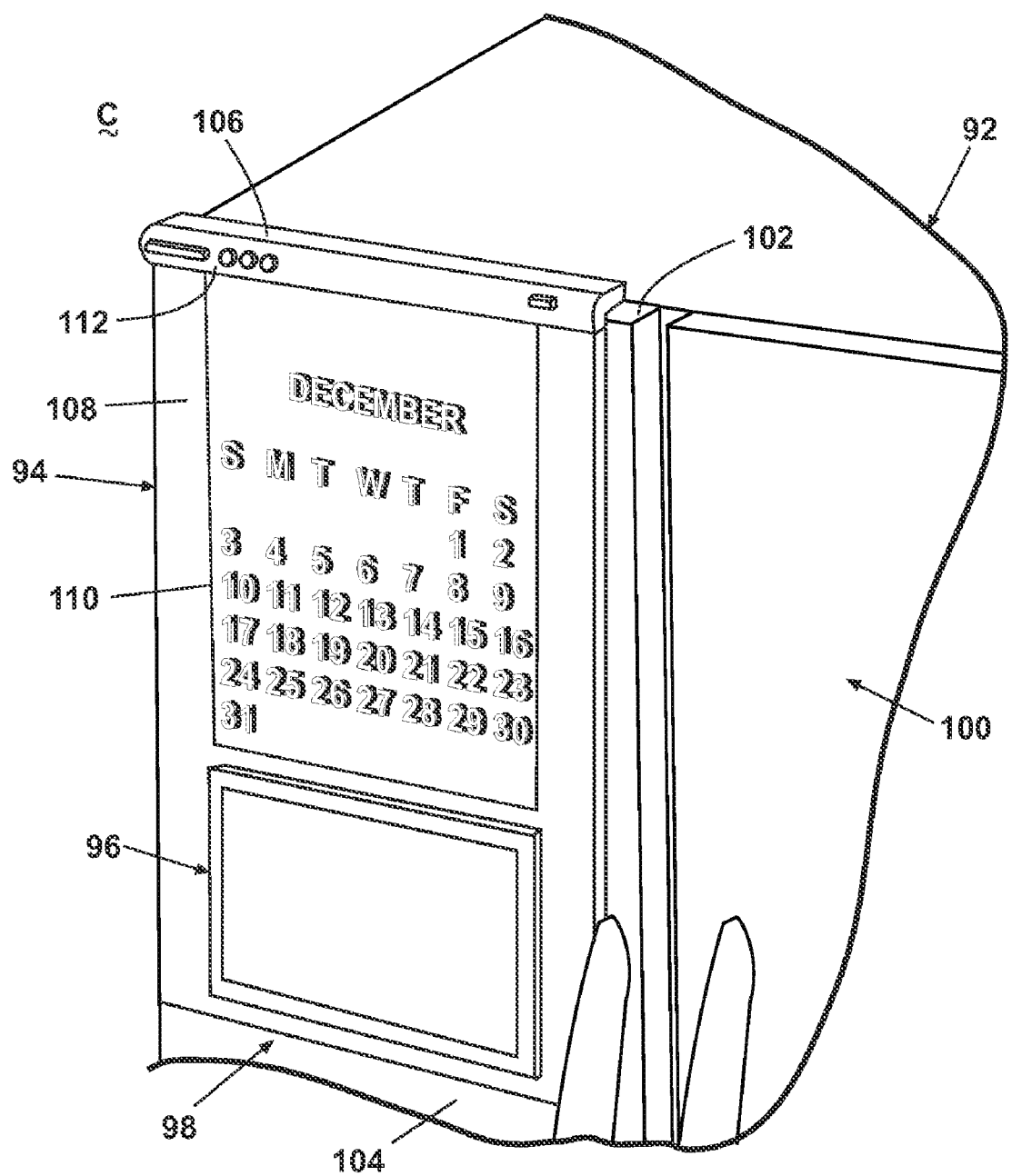
FIG. 7 is a partial perspective view of a third specific embodiment of a modular system, comprising a refrigerator having an adapter with calendar, user interface, and data storage functionality and a television.
Figure 7A:
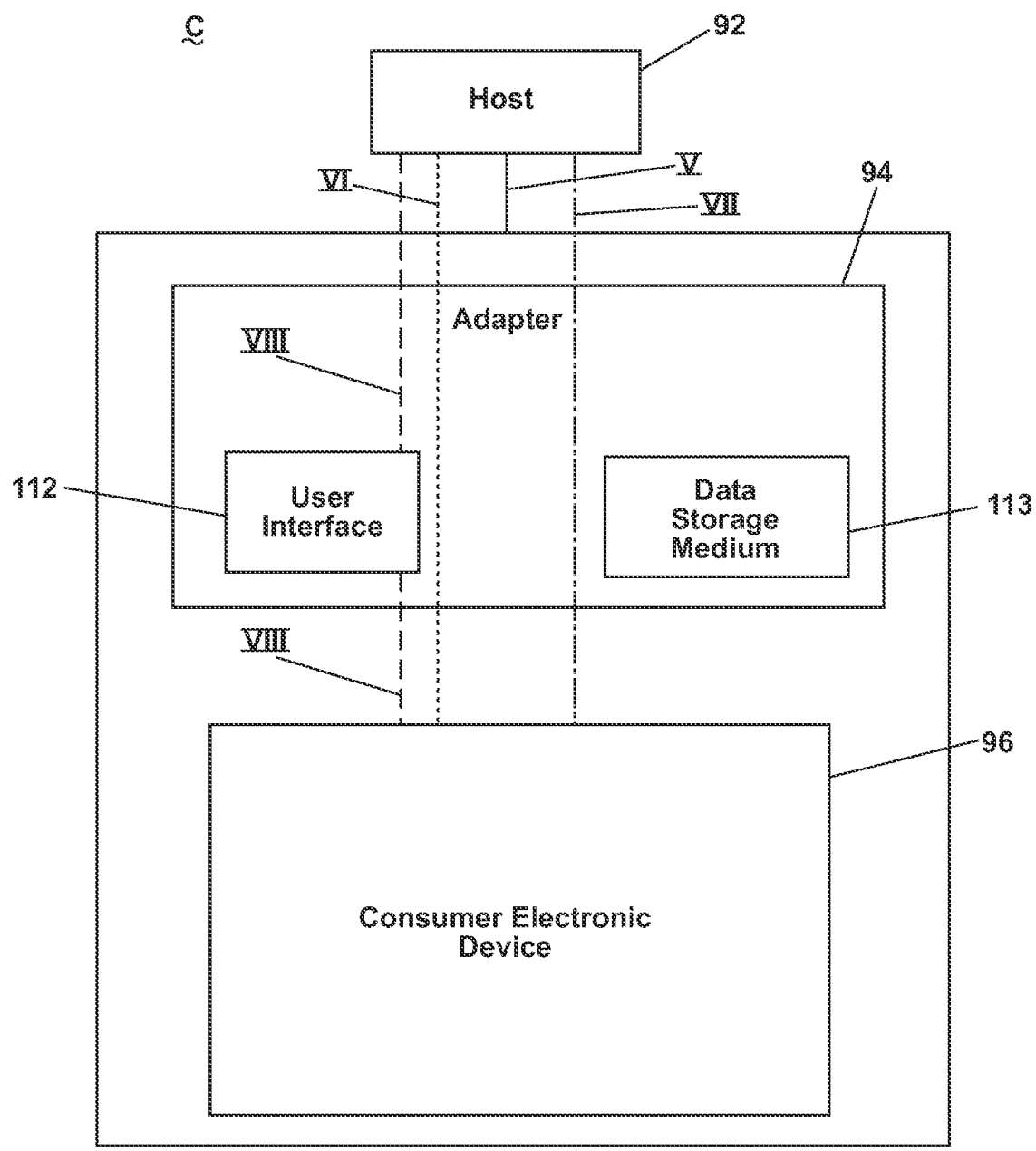
FIG. 7A is a schematic view of the modular system of FIG. 7 when the adapter and the television are coupled to the refrigerator.

Referring to FIGS. 7 and 7A, a third embodiment is shown, where the modular system C comprises a host in the form of a refrigerator 92, an adapter 94, and a consumer electronic device in the form of a television 96. The refrigerator 92 comprises a pair of doors 98, 100 selectively closing a cooling compartment (not shown). The door 98 has a horizontal top surface 102 and a vertical front surface 104.

The adapter 94 comprises a generally L-shaped housing, having a horizontal mounting bracket 106 joined to a vertical main body 108 that removably supports the television 96. The mounting bracket 106 is affixed to the top surface 102 of the door 98 such that the main body 108 rests against the front surface 104.

The adapter 94 further has calendar, user interface and data storage functionality. The adapter comprises a calendar display screen 110, located on the main body 108, above the television 96, which can display a calendar or personal schedule. A user interface 112 is provided on the mounting bracket 106 and can be used to control the operation of the calendar display screen 110, the television 96, and/or the refrigerator 92. A calendar display screen 110 having touch-screen capability can alternately function as a user interface. The adapter 94 further comprises a data storage medium 113, shown schematically in FIG. 7A, for storing calendar and schedule information. For example, one or more user's personal schedule can be stored by the adapter 94 and can be selectively presented on the calendar display screen 110 through manipulation of the user interface 112. Further, the adapter 94 can comprise the ability to automatically coordinate each household user's schedules and present a coordinated household schedule on the calendar display screen 110.

The mechanical, power, and data communication in modular system C when the adapter 94 and the television 96 are coupled to the refrigerator 92 is illustrated schematically in FIG. 7A. In particular, the mounting bracket 106 and main body 108 supply the mechanical communication between the refrigerator 92 and the television 96, as indicated by the solid line V; the adapter 94 supplies power communication from the refrigerator 92, to the television 96, as indicated by the dotted line VI; the adapter 94 supplies data communication from the refrigerator 92, to the television 96, as indicated by the dash-dot-dash line VII; and, the adapter 94 supplies data communication between the user interface 112 and both the refrigerator 92 and the television 96, as indicated by the dashed line VIII. As indicated by the schematic, the adapter 94 comprises internal wiring coupled with the electrical power system of the refrigerator 92, which ultimately receives power from a household power source to provide the service of power communication to the television 96. The refrigerator 92 comprises a television receiver for receiving a television signal and relaying it to the television 96. Alternately, the adapter 94 or the television 96 can comprise an internal source of power and television receiver.

Figure 8:
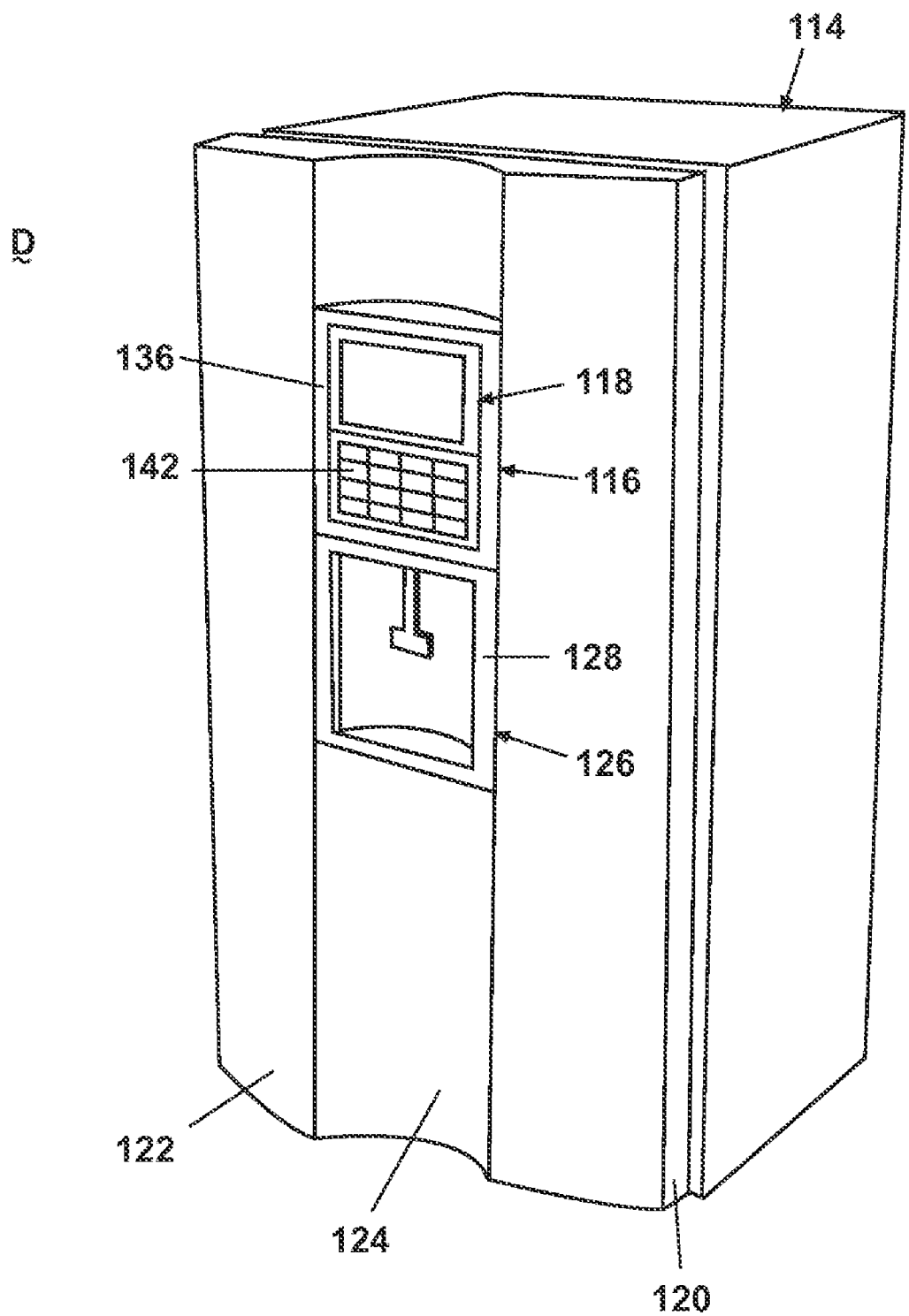
FIG. 8 is a perspective view of a fourth specific embodiment of a modular system, comprising a refrigerator, an adapter with user interface functionality, and a video display.
Figure 9:
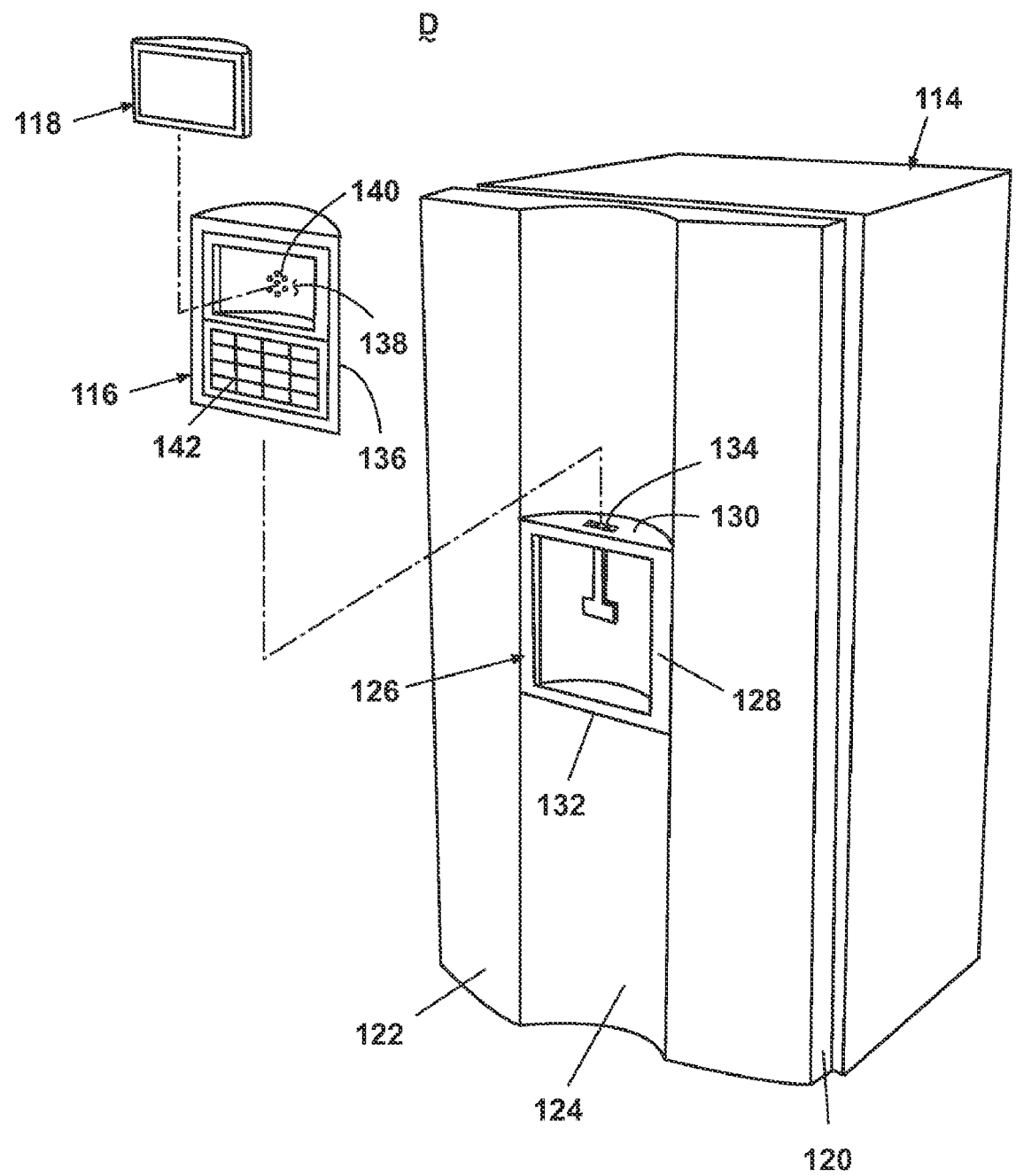
FIG. 9 is an exploded perspective view of the modular system from FIG. 8.

Referring to FIGS. 8 and 9, a fourth embodiment is shown, where a modular system D comprises a host in the form of a refrigerator 114, an adapter 116, and a consumer electronic device in the form of a removable video display 118. The refrigerator 114 comprises a door 120 selectively closing a cooling compartment (not shown). The door 120 comprises a front face 122 and a vertical groove 124, which is illustrated as running the length of the front face 122. The refrigerator 114 further comprises a dispenser 126 for selectively dispensing water and/or ice. The dispenser 126 comprises a dispenser housing 128 that is mounted within the vertical groove 124 so that the front of the housing 128 is generally flush with the front face 122 of the door 120. The housing 128 has a top surface 130 and a bottom surface 132 that are both generally horizontal. A host service interface 134 is provided on the top surface 130 and is preferably integrally formed therewith so that it is not removable from the refrigerator 114. The adapter 116 can be removably coupled to the refrigerator 114 through the host service interface 134. The host service interface 134 can provide both power and data communication, although the connections are not shown, which is supplied to the video display 118 when the adapter 116 is coupled to the host service interface 134 and the video display 118 is coupled to the adapter 116. The data communication provided can comprise a television or Internet connection, and accordingly the video display 118 can be used to watch a television program or access the Internet.

The adapter 116 comprises an adapter housing 136 having a cavity 138 for removably receiving the video display 118. An adapter service interface 140 is provided within the cavity 138 and is configured for coupling with the video display 118. The adapter service interface 140 is coupled with a complementary interface (not shown) on the video display 118 to establish a connection between the adapter 116 and the video display 118, and to supply power and data to the video display 118 through that connection. An interface (not shown) for coupling with the host service interface 134 can be provided on the bottom of the adapter housing 136. To couple the adapter 116 to the host service interface 134, the adapter housing 136 is received within the groove 124, with the adapter 116 resting on the top surface 130 of the dispenser 126.

The adapter 116 further has the added functionality of a user interface 142 that can optionally be used to control the refrigerator 114 when the adapter 116 is coupled to the host service interface 134 and to control the video display 118 when the video display 118 is coupled to the adapter service interface 140. For example, the user interface 142 can be used to control the operation of the dispenser 126.

Figure 10:
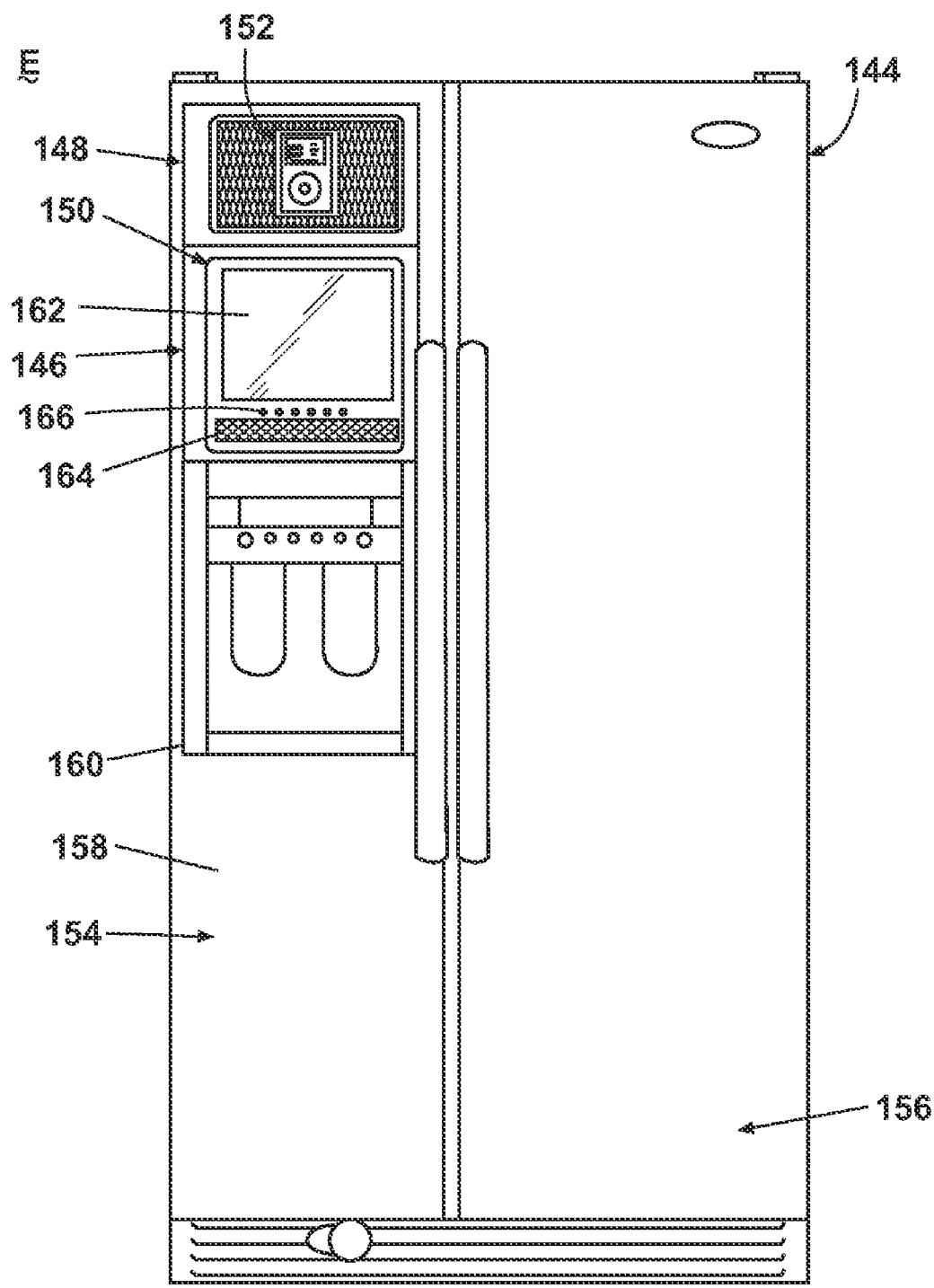
FIG. 10 is a front view of a fifth specific embodiment of a modular system, comprising a refrigerator with two adapters, a television, and a digital music player.

Referring to FIG. 10, a fifth embodiment is shown, where a modular system E comprises a host in the form of a refrigerator 144, a first adapter 146, a second adapter 148, a first consumer electronic device in the form of a television 150 and a second consumer electronic device in the form of a portable digital music player 152, such as an iPOD. The refrigerator 144 comprises a pair of doors 154, 156 selectively closing a cooling compartment (not shown). The door 154 has a vertical front surface 158 and a dispenser 160 for selectively dispensing water and/or ice.

The television 150 is affixed to the adapter 146 and comprises a display screen 162 for viewing a television program, a speaker 164 for projecting sound from the television program, and a user interface 166 for operating the television. The television can 150 comprise its own internal source of power and data, such as a battery and a television receiver, or it can be supplied with power and data from by the adapter 146.

The second adapter 148 removably receives the digital music player 152. The second adapter 148 further has speaker functionality. A speaker 168 is mounted within the second adapter 148 and can receive audio signals from the docked digital music player 152 and convert them to audible sound. When the digital music player 152 is docked within the second adapter 148, it is automatically coupled to the speaker 168 and can optionally receive power from the second adapter 148, the refrigerator 144, or another power source. The digital music player 152 can also be removed from the second adapter 148 and used independently.

Figure 11:
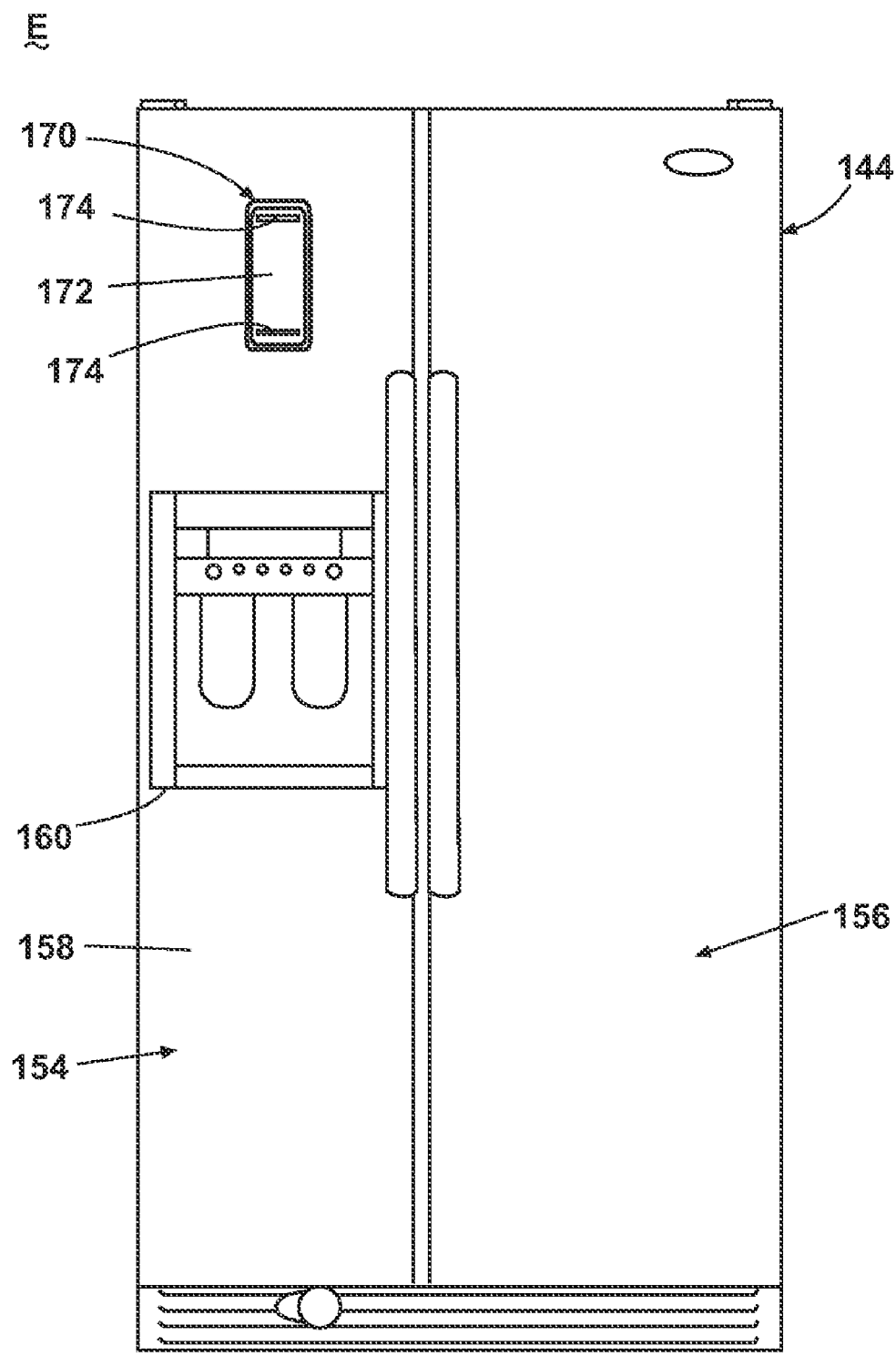
FIG. 11 is a front view of the modular system from FIG. 10, with both adapters, the television, and the digital music player removed from the refrigerator to illustrate a host service interface on the refrigerator.

Referring to FIG. 11, modular system E is shown with the adapters 146, 148, television 150, and digital music player 152 removed from the refrigerator 144. The refrigerator 144 comprises a host service interface 170 configured to couple with one or both of the adapters 146, 148, integrally formed on the front surface 158 of the door 154, above and spaced from the dispenser 160. The host service interface 170 comprises a shallow recess 172 and a pair of generally horizontal slots 174 spaced vertically with respect to one another formed in the recess 172. The slots 174 are standardized and can receive one or more standardized components on the adapters 146, 148, such as standardized mechanical connectors (not shown) on the rear of the adapters 146, 148. Each slot 174 can optionally comprise a hinged door (not shown), similar to the door covering a video tape slot on a VCR, to protect the slot 174 when an adapter is not coupled with the slot 174. As illustrated, when mounted to the host service interface 170, the first adapter 146 rests on top of the dispenser 160, and the second adapter 148 rests on the first adapter 146. Thus the first adapter 148 as well as the refrigerator 144 provides the service of mechanical communication for modular system E. While not shown herein, the slots 174 could also be provided with power and data connectors for providing power and data communication.

Figure 12:
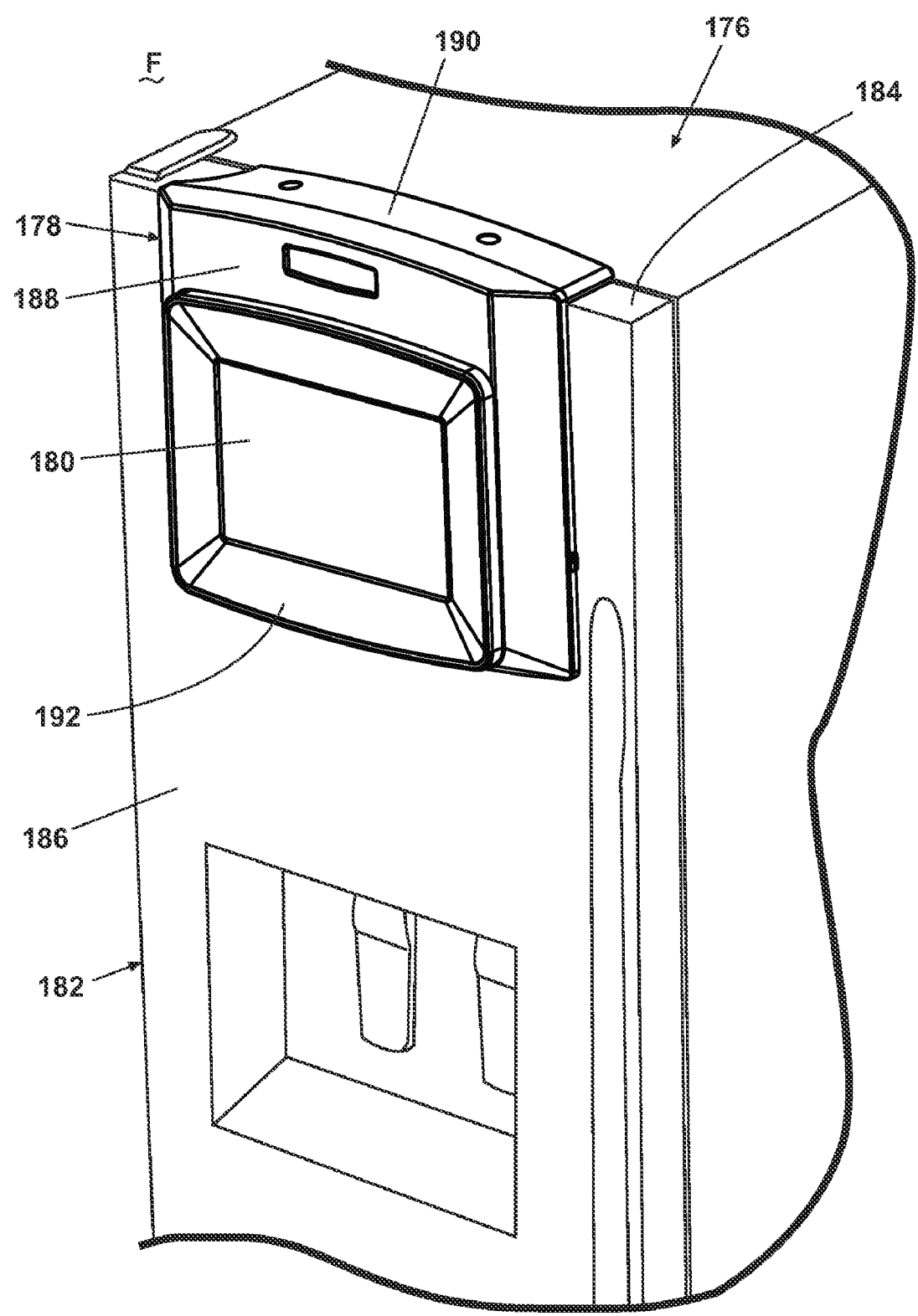
FIG. 12 is a partial perspective view of a sixth embodiment of a modular system, comprising a refrigerator with an adapter and a digital image display.
Figure 13:
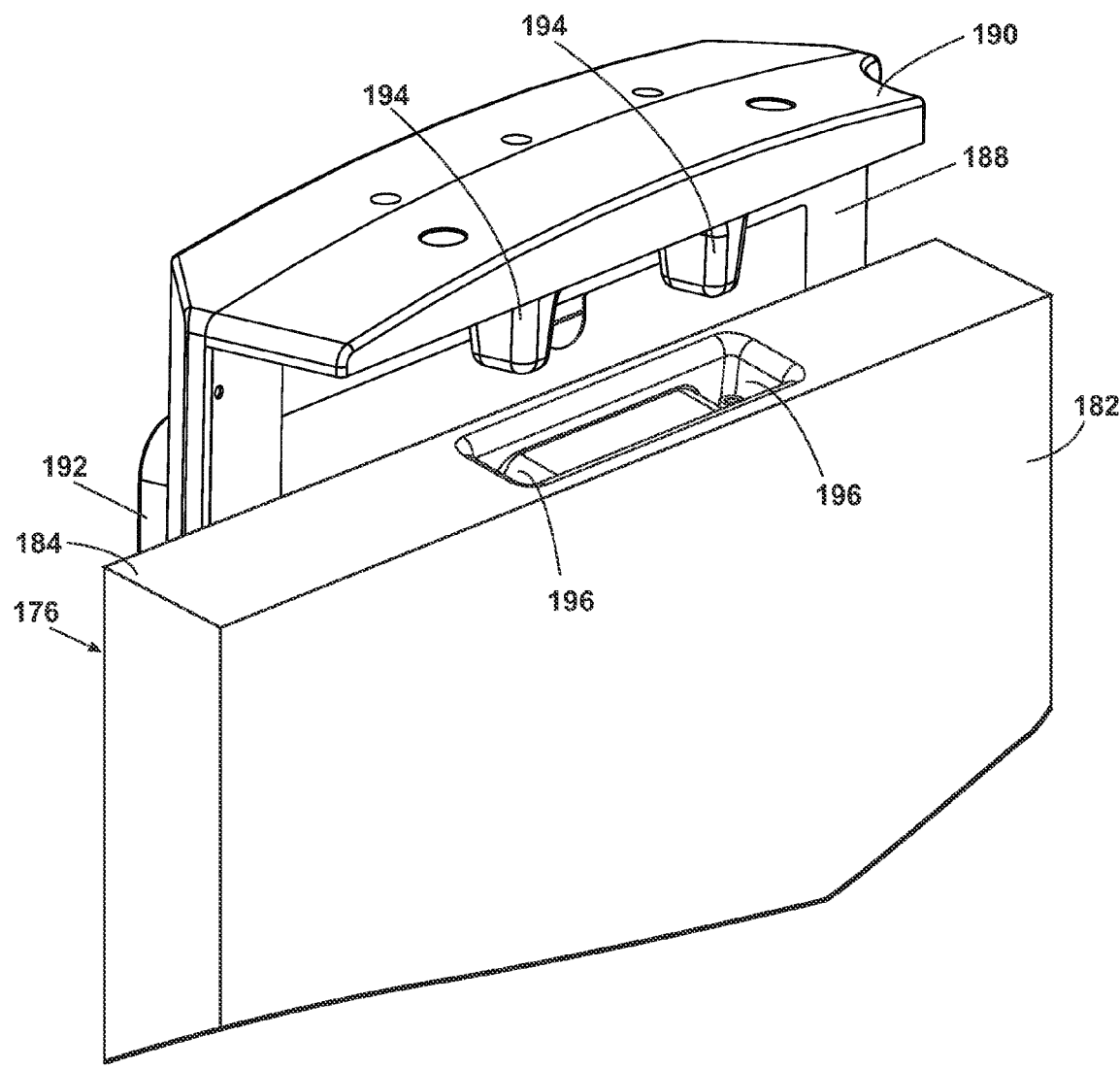
FIG. 13 is a rear perspective view of the modular system of FIG. 12.
Figure 14:
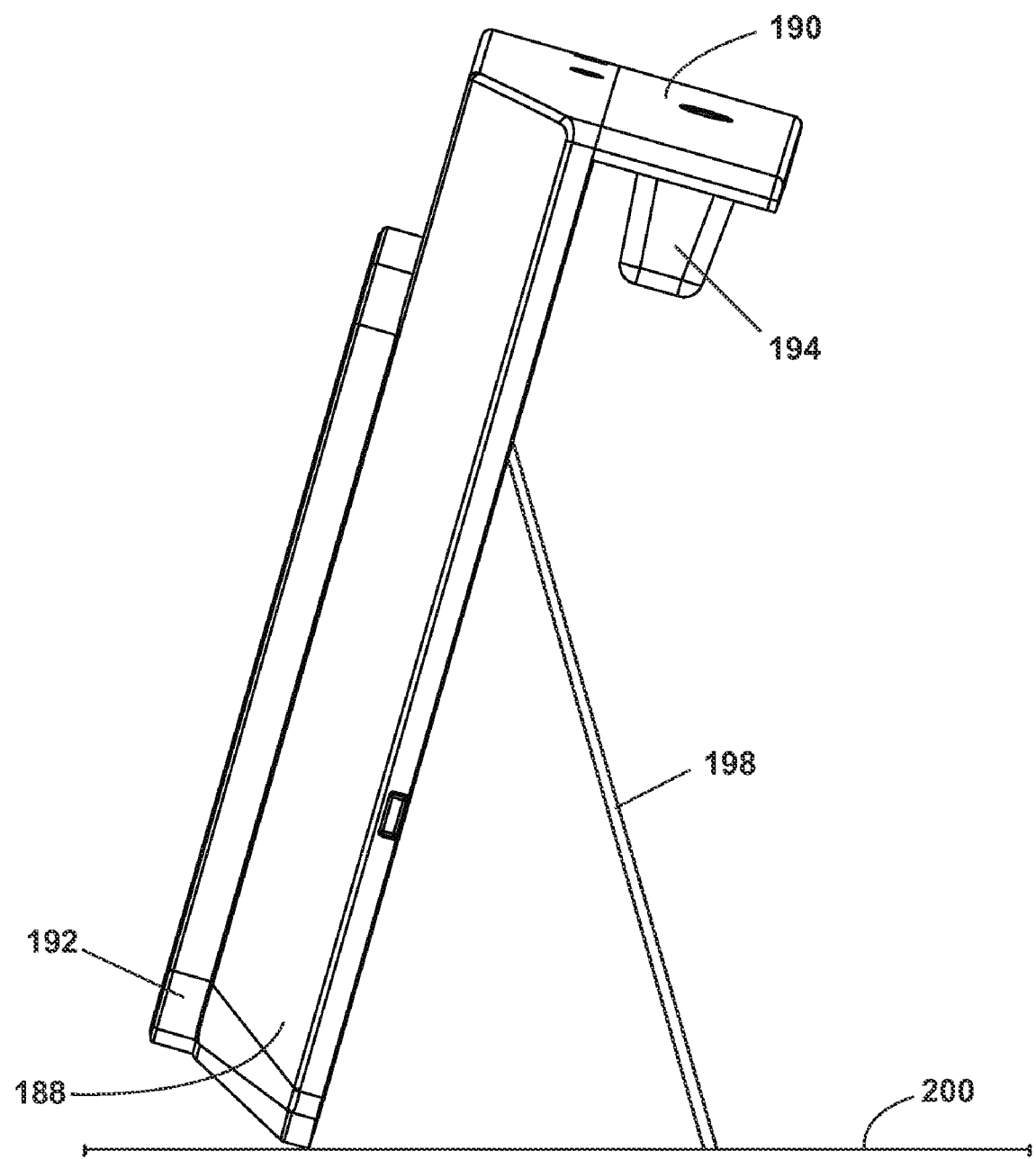
FIG. 14 is a side view of the adapter and the digital image display of FIG. 12 removed from the refrigerator and supported by a stand on a generally horizontal surface.

Referring to FIGS. 12-14, a sixth embodiment is shown, where a modular system F comprises a refrigerator 176, an adapter 178, and a consumer electronic device in the form of a digital image display 180. The refrigerator 176 comprises a door 182 selectively closing a cooling compartment (not shown). The door 182 has a horizontal top surface 184 and a vertical front surface 186. The digital image display 180 is coupled to the door 182 by the adapter 178. A similar adapter 178 and digital image display 180 are more fully described in application Ser. No. 11/619,731, referenced above.

The adapter 178 comprises a main body 188 depending from an upper flange 190. The main body 188 includes a frame 192 that circumscribes the digital image display 180, which sits behind the frame 192. The digital image display 180, which can display still and/or moving images, and the frame 192 together have an appearance similar to that of a conventional picture frame. The upper flange 190 rests on the top surface 184 of the door 182 and, as shown in FIG. 13, includes a pair of downwardly extending anchors 194 that are received within corresponding anchor receivers 196 in the top surface 184. Together, the upper flange 190 and the anchors 194 form a mechanical coupling or hanger to hang the adapter 178 and the digital image display 180 from the door 182. Each of the anchors 194 includes an adapter service interface (not shown) configured to couple with a corresponding host service interface (also not shown) located within each of the anchor receivers 196. The service interfaces mate when the adapter 178 is mounted to the door 182 to establish power and data communication, as discussed in previous embodiments herein.

In operation, a user mounts the adapter 178 and the digital image display 180 to the refrigerator 176 by inserting the anchors 194 into the anchor receivers 196, whereby power and data communication is established. In this configuration, the adapter 178 and the digital image display 180 hang from the refrigerator door 182, as shown in FIG. 12.

To remove the digital image display 180 from the refrigerator 176, the user removes the anchors 194 from the anchor receivers 196, whereby the service interfaces are decoupled This process discontinues the supply of the mechanical, power, and data communication between the refrigerator 176 and the digital image display 180.

The adapter 178 further comprises the functionality of supplying a service when the adapter 178 and the digital image display 180 are not coupled with the refrigerator 176. The adapter 178 can include a stand 198 to facilitate utilizing the adapter 178 and the digital image display 180 when removed from the refrigerator 176. The stand 198 on can be utilized to support the adapter 178 and the digital image display 180 on a generally horizontal surface 200, as illustrated in FIG. 14, in a manner similar to supporting a conventional picture frame on a generally horizontal surface. The adapter 178 can alternately include a hook or hanger (not shown) in place of or in addition to the stand to hang the adapter 178 and, optionally, the digital image display 180 on a vertical surface. For example, the anchors 194 can be modified for this purpose.

The stand 198 provides and supplies mechanical communication when the adapter 178 and the digital image display 180 are removed from the refrigerator 176. The adapter can further comprise an internal power source and a data communication device (not shown) to supply and provide power communication and data communication, respectively, to the digital image display 180 when the adapter 178 and the digital image display 180 are removed from the refrigerator 176.

While the invention has been specifically described in connection with certain specific embodiments thereof, it is to be understood that this is by way of illustration and not of limitation, and the scope of the appended claims should be construed as broadly as the prior art will permit.

What is claimed is:

1. A modular system for removably supporting and providing service to a consumer electronic device performing a first function, the modular system comprising:
   an electrically powered host primarily performing a second function distinct from the first function and having a service interface providing at least a first electrical service and a mechanical support service; and
   an adapter removably coupled to the service interface of the host and:
      performing a third function distinct from the first and second functions, the third function comprising receiving the at least a first electrical service from the host and providing at least a second electrical service, different than the first electrical service, to the consumer electronic device,
      performing a fourth function of removably mechanically supporting the consumer electronic device, and
      providing a fifth function different from the first, second, third and fourth functions when the adapter is coupled to the service interface of the host.

2. The modular system of claim 1, wherein the fifth function comprises supplying at least one additional service from the consumer electronic device to the host.

3. The modular system of claim 1, wherein the fifth function is unrelated to the supply of a service to the host and is unrelated to supply of a service to the consumer electronic device.

4. The modular system of claim 1, wherein the adapter selectively performs the fifth function when the consumer electronic device is mounted to the adapter.

5. The modular system of claim 1, wherein the adapter comprises at least one functional component for performing the fifth function, the functional component comprising at least one of: a user interface for controlling the operation of the host; a user interface for controlling the operation of the adapter; a user interface for controlling the operation of the consumer electronic device; a speaker; a whiteboard; a video display; a radio; a data storage medium; a power storage medium; and a music player.

6. The modular system of claim 1, wherein the fifth function comprises one of a calendar, media manager, physical storage, power storage, and data storage.

7. The modular system of claim 1 wherein the host is an appliance and the second function is a useful cycle of operation on at least one consumer item.

8. The modular system of claim 1 wherein the fifth function is powered by the host.

9. The modular system of claim 1 wherein the fifth function is powered by the consumer electronic device.

10. The modular system of claim 1 wherein the fifth function is powered independently of the host and the consumer electronic device.

11. A modular system comprising:
an electrically powered host performing a first function, the first function being primarily a physical function and having a service interface providing a first electrical service and a mechanical support service;
a consumer electronic device performing a second function, the second function primarily being an information function; and
an adapter removably coupled to the service interface to receive the mechanical support service to mount the adapter to the host and receive the first electrical service; and
performing a third function of providing a second electrical service, different than the first electrical service, to the consumer electronic device,
performing a fourth function of removably supporting the consumer electronic device, and
providing a fifth function, different from the first, second, third and fourth functions when the adapter is coupled to the service interface of the host.

12. The modular system of claim 11, wherein the fifth function provides an additional functionality to at least one of the host, the consumer electronic device, and a user.

13. The modular system of claim 11, wherein the adapter selectively performs the fifth function when the consumer electronic device is mounted to the adapter.

14. The modular system of claim 11, wherein the adapter comprises at least one functional component for performing the fifth function and further wherein the functional component comprises at least one of: a user interface for controlling the operation of the host; a speaker; a video display; a radio; a whiteboard; a data storage medium; a power storage medium; a physical storage compartment; a calendar; and a music player.

15. The modular system of claim 11, wherein the consumer electronic device is one of a video display, a radio, and a music player.

16. The modular system of claim 11, wherein the third function comprises at least one of a power communication and data communication.

17. The modular system of claim 11 wherein the fifth function is powered by at least one of the host and the consumer electronic device.

18. The modular system of claim 11 wherein the fifth function is powered independently of the host and the consumer electronic device.

19. An adapter for coupling a consumer electronic device, which performs a first function and has a first service interface, to an electrically powered host, which performs a second function that is distinct from the first function and has a second service interface providing at least a first electrical service and a mechanical support service, the adapter comprising:
a third service interface compatible to removably couple to the first service interface of the consumer electronic device and performing a third function of removably mechanically supporting the consumer electronic device;
a fourth service interface compatible to removably couple to the second service interface of the host;
a first component providing a fourth function distinct from the first and second functions, the fourth function comprising receiving the at least a first electrical service through the coupled second and fourth service interfaces and providing at least a second electrical service, different than the first electrical service, to the consumer electronic device through the coupled first and third service interfaces; and
a second component providing a fifth function different from the first, second, third and fourth functions when the adapter is coupled to the host through the second and fourth service interfaces.

20. The adapter of claim 19, wherein the fifth function comprises supplying a second electrical service from the consumer electronic device to the host.

21. The adapter of claim 19, wherein the fifth function provides an additional functionality to a user.

22. The adapter of claim 21, wherein the fifth function comprises one of a calendar, media manager, physical storage, power storage, and data storage.

23. The adapter of claim 19, wherein the adapter selectively performs the fifth function when the consumer electronic device is mounted to the adapter.

24. The adapter of claim 19, wherein the fifth function is unrelated to the supply of a service.

25. The adapter of claim 19, wherein the adapter comprises at least one functional component for performing the fifth function, wherein the functional component comprises at least one of: a user interface for controlling the operation of the host; a user interface for controlling the operation of the consumer electronic device; a user interface for controlling the operation of the adapter; a speaker; a video display; a radio; a whiteboard; a data storage medium; a power storage medium; a physical storage compartment; a calendar; and a music player.

* * * * *